(12) United States Patent
Messano

(10) Patent No.: US 6,679,543 B2
(45) Date of Patent: Jan. 20, 2004

(54) RECREATIONAL VEHICLE FULL-LENGTH SLIDEOUT SYSTEM

(76) Inventor: Frank Messano, 2100 Heyneman La., Simi Valley, CA (US) 93065

( * ) Notice: Subject to any disclaimer, the term of this patent is extended or adjusted under 35 U.S.C. 154(b) by 0 days.

(21) Appl. No.: 10/177,314

(22) Filed: Jun. 24, 2002

(65) Prior Publication Data

US 2002/0153745 A1 Oct. 24, 2002

Related U.S. Application Data

(63) Continuation-in-part of application No. 10/142,403, filed on May 10, 2002, and a continuation-in-part of application No. 09/766,996, filed on Jan. 23, 2001, now Pat. No. 6,425,625.

(51) Int. Cl.$^7$ ................................................. B60P 3/34
(52) U.S. Cl. ..................... 296/175; 296/165; 296/26.09; 296/26.14; 296/197; 296/210
(58) Field of Search ........................... 296/26.01, 26.03, 296/26.08–26.15, 165, 171, 172, 175, 176, 193, 196, 197, 210

(56) References Cited

U.S. PATENT DOCUMENTS

| | | | | |
|---|---|---|---|---|
| 2,132,409 A | * | 10/1938 | Gedeon | ...................... 296/172 |
| 2,150,615 A | * | 3/1939 | Sword | ..................... 296/26.13 |
| 2,235,662 A | | 3/1941 | Arehart | |
| 2,425,948 A | * | 8/1947 | Lucien | ........................ 296/196 |
| 2,581,192 A | * | 1/1952 | La Fleur | ...................... 296/172 |
| 4,358,914 A | * | 11/1982 | Geyer | ........................ 296/210 |
| 4,451,058 A | | 5/1984 | Curry | |
| 4,598,785 A | | 7/1986 | LeBlanc | |
| 4,881,752 A | | 11/1989 | Tanaka | |
| 5,118,131 A | | 6/1992 | Manning | |
| 5,218,792 A | | 6/1993 | Cooper | |
| 5,240,278 A | | 8/1993 | Nelms | |
| 5,295,430 A | | 3/1994 | Dewald | |
| 5,314,230 A | | 5/1994 | Hutchison | |
| 5,433,578 A | | 7/1995 | Honan | |
| 5,586,802 A | | 12/1996 | Dewald | |
| 5,690,378 A | | 11/1997 | Romesburg | |
| 5,800,002 A | | 9/1998 | Tiedge | |
| 5,833,023 A | | 11/1998 | Shimizu | |
| 5,934,728 A | * | 8/1999 | Nishi et al. | ............... 296/26.15 |
| 6,098,346 A | | 8/2000 | Miller | |
| 6,152,475 A | | 11/2000 | Poole | |
| 6,173,482 B1 | | 1/2001 | Riddle | |
| 6,209,672 B1 | | 4/2001 | Severinsky | |
| 6,220,654 B1 | | 4/2001 | Sommer | |
| 6,237,926 B1 | | 5/2001 | Pritchard | |
| 6,293,612 B1 | * | 9/2001 | Crean | .......................... 296/175 |
| 6,325,437 B2 | * | 12/2001 | Hiebert et al. | ........... 296/26.03 |
| 6,364,806 B1 | | 4/2002 | Spaniel | |
| 6,376,927 B1 | | 4/2002 | Tamai | |
| 6,378,638 B1 | | 4/2002 | Mizon | |
| 6,394,209 B1 | | 5/2002 | Goehring | |
| 6,394,924 B1 | | 5/2002 | Schiebold | |

FOREIGN PATENT DOCUMENTS

| | | | | |
|---|---|---|---|---|
| CA | 528037 | * | 7/1956 | ............... 296/26.13 |
| FR | 962389 | * | 6/1950 | ................. 296/197 |
| GB | 14657 | | * of 1896 | ................. 296/165 |

* cited by examiner

Primary Examiner—Dennis H. Pedder

(57) ABSTRACT

A Comprehensive Modular RV Hybrid Electric Drive And Modular Construction System for recreational vehicles, including motorhomes, trailers, amphibious vehicles, and houseboats, and with full-length vehicle widening slide-outs.

14 Claims, 13 Drawing Sheets

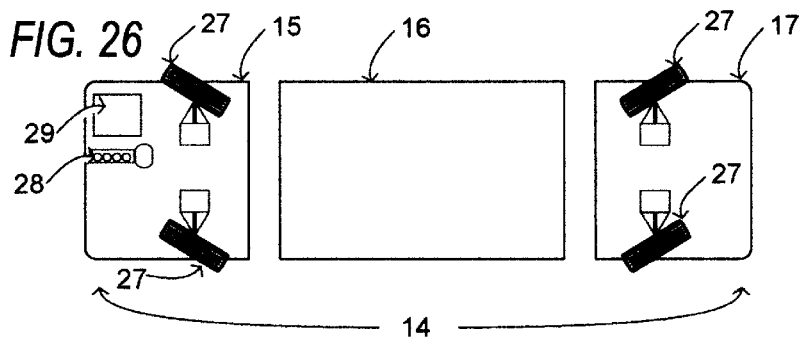
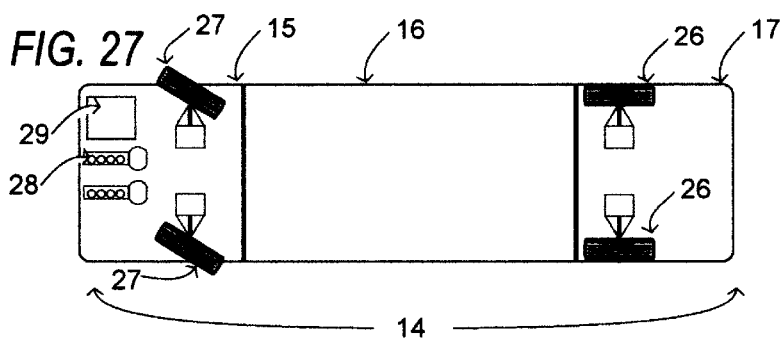
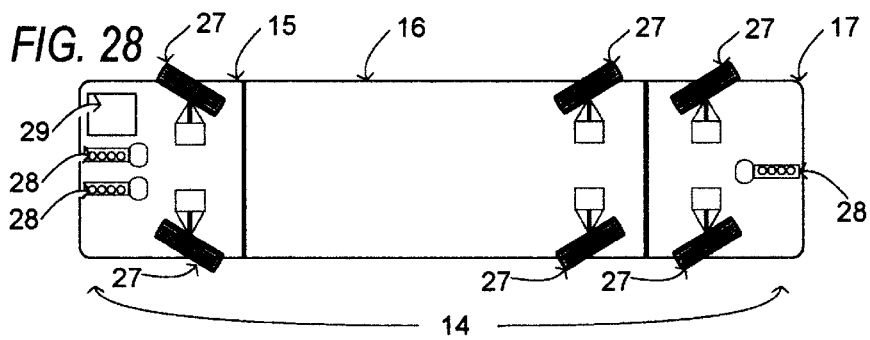
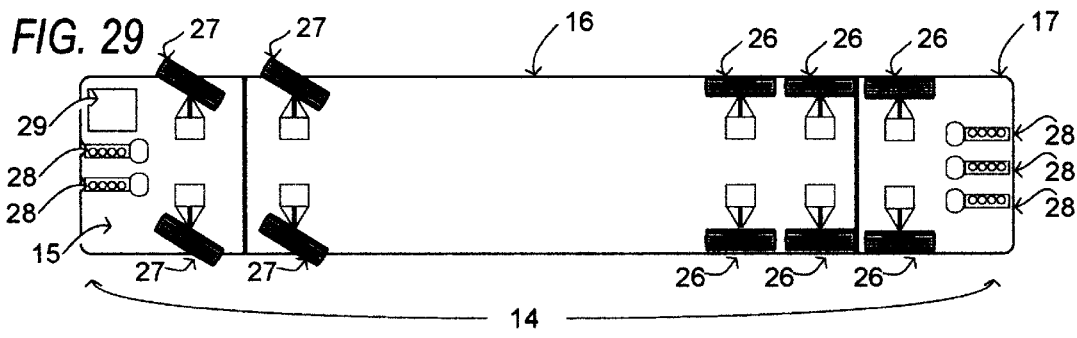

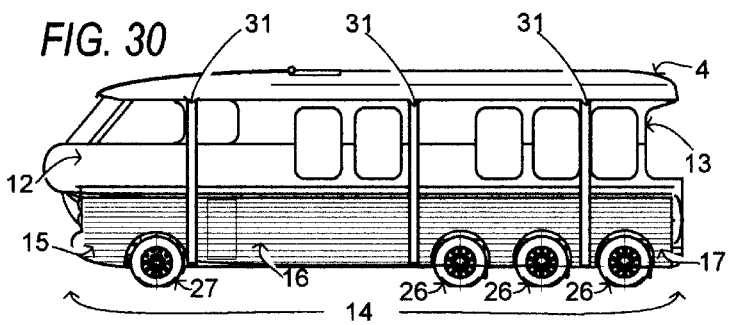
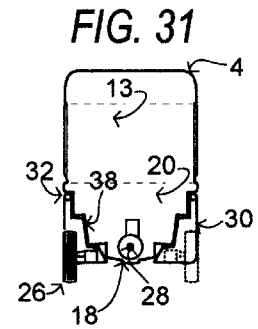
FIG. 30
FIG. 31
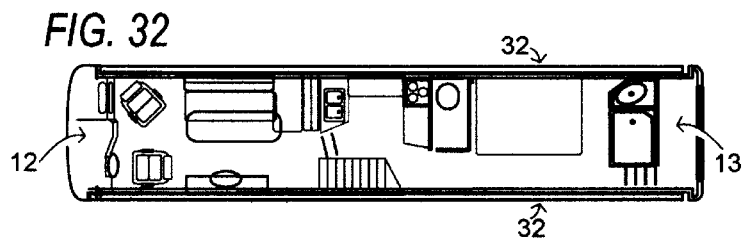
FIG. 32
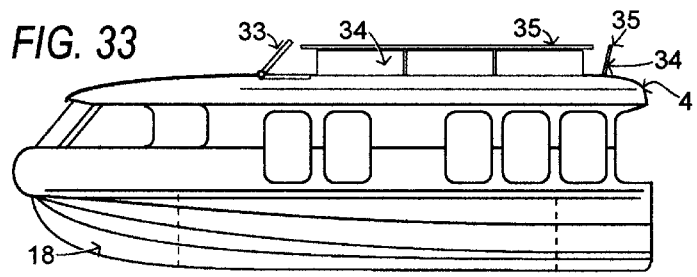
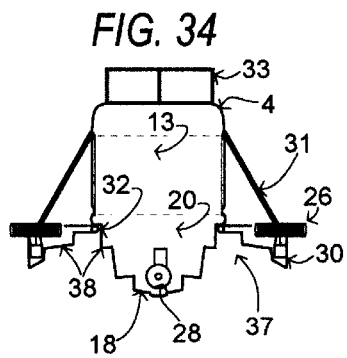
FIG. 33
FIG. 34
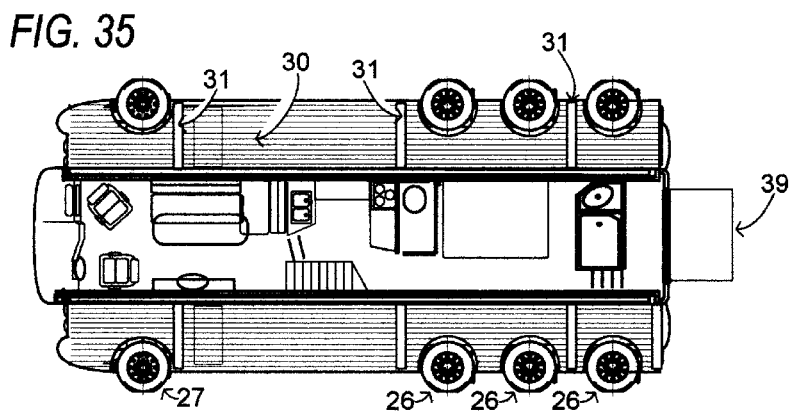
FIG. 35

RECREATIONAL VEHICLE FULL-LENGTH SLIDEOUT SYSTEM

PARENT CASE TEXT

This is a continuation-in-part of application Ser. No. 09/766,996 filed Jan. 23, 2001—ROOFTOP DECK SYSTEMS FOR VEHICLES, filed Jan. 23, 2001 now U.S. Pat. No. 6,425,625 and application Ser. No. 10/142,403 SEATING, HANDRAILS & CANOPY FOR ROOFTOP SYSTEMS, filed May 10, 2002.

CROSS-REFERENCE TO RELATED APPLICATIONS

This invention relates to my previous U.S. Pat. No. 6,237,988—STREAMLINE ROOFTOP DECK FOR MOTORHOMES and allowed U.S. patent application Ser. No. 09/766,966—ROOFTOP DECK SYSTEMS FOR VEHICLES which included claims for a monocoque roof and rooftop cowlings on vehicles.

DESCRIPTION

1. Field of the Invention

The present invention relates to construction features of recreational vehicles (motorhomes, vans, SUVs, trailer, amphibians, houseboats, and the like) and more particularly, a modular-monocoque system and component parts which assembled combinations yield a variety of new recreational vehicle utilities.

This present invention relates in part to streamline cowling rooftop deck assemblies for vehicles as described in my U.S. Pat. No. 6,237,988-STREAMLINE ROOFTOP DECK FOR MOTORHOMES which claims . . .

A vehicle rooftop deck system comprising:
   a plurality of streamline cowlings enclosing the perimeter of a vehicle rooftop;
   a plurality of rooftop safety handrails which fold down to a low profile for travel, which fold upward for use, which enclose the perimeter of the rooftop when in the upward position, and which affix to the rooftop;
   folding rooftop furniture, backs of which support the safety handrails, and which backs fold down to a low profile for travel and which backs fold upward for use, and furniture understructure which affixes the furniture to the rooftop and which affixes the streamline cowlings to the vehicle rooftop.
With additional claims that include . . .
wherein a raising and lowering convertible top unit is fixed in place within the deck.

And this present invention further relates to my invention application Ser. No. 09/766,966—ROOFTOP DECK SYSTEMS FOR VEHICLES which claims . . .

A vehicle rooftop deck system comprising:
   a cowling enclosing the perimeter of a vehicle rooftop;
   a plurality of rooftop safety handrails which fold down to a low profile for travel, which fold upward for use, which enclose the perimeter of the rooftop when in the upward position;
   folding rooftop furniture which backs fold down to a low profile for travel and which backs fold upward for use.
With its additional claims . . .
wherein the cowling is one-piece.
wherein the cowling and furniture understructure are one-piece.
wherein the cowling, furniture understructure and a rooftop deck are one-piece.
wherein the one-piece cowling, furniture understructure and deck assembly form the roof of the vehicle.
wherein the cowling and a deck are one-piece.
wherein a number of sub-assemblies form a one-piece molded roof-deck structure.
wherein a number of sub-assemblies form a one-piece monocoque roof-deck structure.
wherein the system is also comprised of the vehicle roof with a hatchway through the roof to the interior of the vehicle.
wherein the vehicle is a motorhome.
wherein the vehicle is a trailer.
wherein the vehicle is amphibious.
wherein the furniture folding backs support the safety handrails.
wherein the cowling encloses only a portion of the perimeter of a vehicle roof
wherein the safety handrails only enclose a portion of the perimeter of a vehicle roof And also, this present invention relates to my invention Application of May 10, 2002 Ser. No. 10/142,403—SEATING, HANDRAILS & CANOPY FOR ROOFTOP DECK VEHICLES which claims . . .

A vehicle rooftop deck system comprising:
   a raising and lowering roof-cover atop a vehicle exterior rooftop deck;
   a rigid uppermost surface of said roof-cover;
   a plurality of rooftop elements supporting said roof-cover;
   a drive linkage connected to said elements for raising and lowering them in unison;
   a power actuator to raise and lower said supporting elements;
   a waterproof vertical raceway locating said actuator system below the rooftop deck;
   a plurality of rooftop affixed safety handrails which raise and lower under said roof-cover;
   and a plurality of rooftop affixed seating which raise and lower under said roof-cover.
With its additional claims . . .
wherein the roof-cover is fabric.
without a powered drive linkage.
without locating the actuator system below the rooftop.
without the safety handrails.
without the seating.
without a combination of one or more of the following . . . the powered drive linkage, with out locating the actuator system below the rooftop, without safety handrails, or without the rooftop affixed seating.
wherein the vehicle is a recreational vehicle (motorcoach, motorhome, trailer, camper, van, caravan, sport utility vehicle, and the like).
wherein the vehicle is amphibious.
wherein the vehicle is a watercraft (houseboat, boat, and the like).
without the raising and lowering roof-cover.
without a combination of one or more of the following . . . the roof-cover, handrails, the seating, the powered actuator.
and where the seating backs incorporate the handrails.

This new invention herein is an enhancement of the rooftop cowling systems of my said pending and issued patents, incorporating some elements of the aforementioned inventions.

2. Discussion of the Prior Art

In the recreational vehicle industry, room "slide-outs" to increase interior space have been limited to one or two small sized units along an exterior sidewall of a vehicle, so as to leave sections of the sidewall in place to support the roof of the vehicle. My previous rooftop inventions with cowlings, referenced herein, provide for a roof side-profile that is about two feet in height above the sidewall. This tall height cross-section of a cowled roof, when suitably stiffened in structure (internal truss, monocoque, modular monocoque, or other stiffening means) no longer requires central portions of the vehicle sidewall to support the roof, thus allowing for a slide-out nearly the length of the vehicle. In addition, because the slide-out is nearly full vehicle length, the slide-out can be much wider (compared to the vehicle width) than previous slide-out designs, and the slide-out can rotate outward from the side of the vehicle in addition to sliding out from the sidewall.

It is known in the art for recreational vehicles to have composite roofs and monocoque roofs of a low height cross section, but it is not known for recreational vehicles to have a tall height cross section which outer edges are substantially higher than the central roof plane. See, for example, U.S. Pat. No. 5,218,792 (Cooper 1993), U.S. Pat. No. 5,690,378 (Romesburg 1997), U.S. Pat. No. 5,295,430 (Dewald 1994), U.S. Pat. No. 5,586,802 (Dewald 1996), U.S. Pat. No. 5,800,002 (Tiedge 1998), U.S. Pat. No. 6,098,346 (Miller 2000), and U.S. Pat. No. 6,293,612 (Crean 2001).

Similarly, in the recreational vehicle industry, attempts have been made in the prior art to permit a relatively modular approach to manufacturing of vehicles, as disclosed, for example, in U.S. Pat. No. 2,235,662 (Arehart 1941), U.S. Pat. No. 5,314,230 (Hutchison 1994), U.S. Pat. No. 5,833,023 (Shimizu 1998), U.S. Pat. No. 6,173,482 (Riddle 2001), and U.S. Pat. No. 6,220,654 (Sommer 2001). The subject of the known art is of modular sub-assemblies used for constructing a single type of vehicle. On a broader scope, it is seen that motorhomes, trailers, amphibians, and houseboats (and other recreational vehicles) are comprised of similar elements and similar equipment. For example a typical 40' motorhome will have a diesel engine, a separate diesel electrical generator (Genset), a bank of batteries, a toilet with holding tanks, a freshwater pump system and tank, an on-board battery charger, a bedroom, a living room, a kitchen, and a rooftop deck. Similarly, a typical 40' yacht may also have a diesel engine, a separate diesel electrical generator (Genset), a bank of batteries, a toilet with holding tanks, a freshwater pump system and tank, an on-board battery charger, a bedroom, a living room, a kitchen, and a rooftop deck. Viewed on this broad level, it becomes possible to develop a vehicle construction system where a limited number of modular elements can be assembled into motorhomes, trailers, yachts, houseboats, amphibians, and other recreational vehicles.

Finally, the motorized recreational vehicle (motorhome) industry bases the size of their vehicles on available pre-manufactured chassis and engine units from diesel engine, truck, and bus chassis manufacturers. This limits the design and capacity of motorhomes to these pre-manufactured engine-chassis combinations. This engine-chassis limitation, in turn, limits the potential of the said Modular Monocoque RV Construction System from which a number of varying size and powered vehicles can be assembled from a small library of body and drive line components. Consequently, a related Modular Hybrid Electric RV Drive System, functioning in consonance with the said Modular Monocoque RV Construction System is desirable. Hybrid Electric Drives are not new in the art, nor are steering axles, independent suspension drives, multi-motor traction drives, and retractable drive wheels. See, for example, U.S. Pat. No. 4,451,058 (Curry 1984), U.S. Pat. No. 4,598,785 (LaBlanc 1086), U.S. Pat. No. 4,881,752 (Tanka 1989), U.S. Pat. No. 5,118,131 (Manning 1992), U.S. Pat. No. 5,240,278 (Nelms 1993), U.S. Pat. No. 5,433,578 (Curry 1995), U.S. Pat, No. 6,152,475 (Poole 2000), U.S. Pat. No. 6,209,672 (Severinsky 2001), U.S. Pat. No. 6,237,926 (Pritchard 2001), U.S. Pat. No. 6,364,806 (Spaniel 2002), U.S. Pat. No. 6,394,209 (Goehring 2002), U.S. Pat. No. 6,376,927 (Tamai 2002), U.S. Pat. No. 6,378,638 (Mizon 2002), and U.S. Pat. No. 6,394,924 (Schiebold 2002). While these are all disassociated systems, a Comprehensive Modular RV Hybrid Electric Drive And Construction System for recreational land and water vehicles is not now known in the art, and it is therefore a new utility.

SUMMARY OF THE INVENTION

A Comprehensive Modular RV Hybrid Electric Drive And Modular Construction System for recreational vehicles, including motorhomes, trailers, amphibious vehicles, and houseboats, and with full-length vehicle widening slide-outs.

BRIEF DESCRIPTION OF THE DRAWINGS

Other features and advantages of the present invention will be apparent from the following detailed descriptions of preferred embodiments thereof when read in conjunction with reference to the accompanying drawings, wherein:

FIG. 26 is the same view as FIG. 25 depicting the Monocoque Drive-Deck Component and showing the Front Power-Bay with two turned-positioned Universal-Motor Power Suspension Modules, one Universal-Electrical Generator Module and one Systems Control Unit, and showing in the Rear Power-Bay two turned-positioned Universal-Motor Power Suspension Modules.

FIG. 27 is the same view as FIG. 25 depicting the Monocoque Drive-Deck Component and showing the Front Power-Bay with two turned-positioned Universal-Motor Power Suspension Modules, two Universal-Electrical Generator Modules and one Systems Control Unit, and showing in the Rear Power-Bay two straight-ahead-positioned Universal-Motor Power Suspension Modules.

FIG. 28 is the same view as FIG. 25 depicting the Monocoque Drive-Deck Component and showing the Front Power-Bay with two turned-positioned Universal-Motor Power Suspension Modules, two Universal-Electrical Generator Modules and one Systems Control Unit, and showing the lengthened Center Storage-Bay with two turned-positioned Universal-Motor Power Suspension Modules, and showing in the Rear Power-Bay two turned-positioned Universal-Motor Power Suspension Modules and one Universal-Electrical Generator Module.

FIG. 29 is the same view as FIG. 25 depicting the Monocoque Drive-Deck Component and showing the Front Power-Bay with two turned-positioned Universal-Motor Power Suspension Modules, two Universal-Electrical Generator Modules and one Systems Control Unit, and showing the lengthened Center Storage-Bay with two turned-positioned Universal-Motor Power Suspension Modules and four straight-ahead-positioned Universal-Motor Power Suspension Modules, and showing in the Rear Power-Bay two straight-ahead-positioned Universal-Motor Power Suspension Modules and three Universal-Electrical Generator Modules.

FIG. 30 is a side view of one embodiment of FIGS. 16 & 18 depicting the Roof-cowled Unitized Modular Monocoque Construction System expressed as an Amphibious Motorhome, showing two turned-positioned Universal-Motor Power Suspension Modules at the front of the vehicle (one per side), and six straight-ahead-positioned Universal-Motor Power Suspension Modules at the rear (three per side).

FIG. 31 is a mid-point cross section through the Amphibious Motorhome depicted in FIG. 30.

FIG. 32 is a typical interior floor plan of the Amphibious Motorhome depicted in FIG. 30.

FIG. 33 is a side view of the same Amphibious Motorhome depicted in FIG. 30, exposing the Monocoque Amphibious-Deck Component for water use as depicted in FIG. 18.

FIG. 34 is the same mid-point cross section through the Amphibious Motorhome depicted in FIG. 31, but showing the Universal-Motor Power Suspension Modules within the Hinged Sponsons extended outward to form a cathedral hull configuration for water use.

FIG. 35 is the same typical interior floor plan of the Amphibious Motorhome depicted in FIG. 32, but showing the Universal-Motor Power Suspension Modules within the Hinged Sponsons extended outward (as shown in cross section FIG. 34) to form a cathedral hull configuration for water use.

DETAILED DESCRIPTION OF THE PREFERRED EMBODIMENTS

In my previous U.S. Pat. No. 6,237,988 (Messano)— STREAMLINE ROOFTOP DECK FOR MOTORHOMES, one of the claims is "A vehicle rooftop deck system comprising: a plurality of streamline cowlings enclosing the perimeter of a vehicle rooftop". And my PTO allowed U.S. patent application Ser. No. 09/766,966-ROOFTOP DECK SYSTEMS FOR VEHICLES includes claims for a monocoque roof and rooftop cowlings on vehicles.

This new invention is, in part, an enhancement of these previous inventions, of which one claim is for a cowl stiffened vehicle roof with the elimination of the majority of the vehicle exterior sidewall(s) between the front of the vehicle and the back of the vehicle.

And a related claim of this new invention is an outwardly expanding room (known in the art as a "Slide-Out") which is substantially the full-length of the vehicle . . . made possible by elimination of said majority of the vehicle exterior sidewall(s).

And another claim of this new invention is for said full-length Slide-Out to incorporate a pivoting element which allows the Slide-Out to extend much further outward from the side of the vehicle, thus making the expanded interior space of the vehicle larger than otherwise possible.

And a further claim of this new invention is a related modular monocoque building system and related drive system.

The following drawings depict typical applications of the invention to illustrate its utility and function to the reader, but they are not meant to be limiting in the scope of the inventions. The arrangements, angles, dimensions, proportions, shapes, and construction materials of the rooftop system (truss, monocoque, and other stiffening structure being equivalent herein) may vary with each application on each vehicle while being fully within the scope of this invention. Similarly, the resulting Full-Length Slide-Out arrangements, angles, dimensions, lengths, widths, proportions, shapes, number of elements and construction materials may vary with each application on each vehicle while being fully within the scope of this invention. And similarly with the modular monocoque building system and the related drive system, the angles, dimensions, lengths, widths, proportions, number of elements, components, and construction materials may vary with each application on each vehicle while being fully within the scope of this invention.

Figure 1:
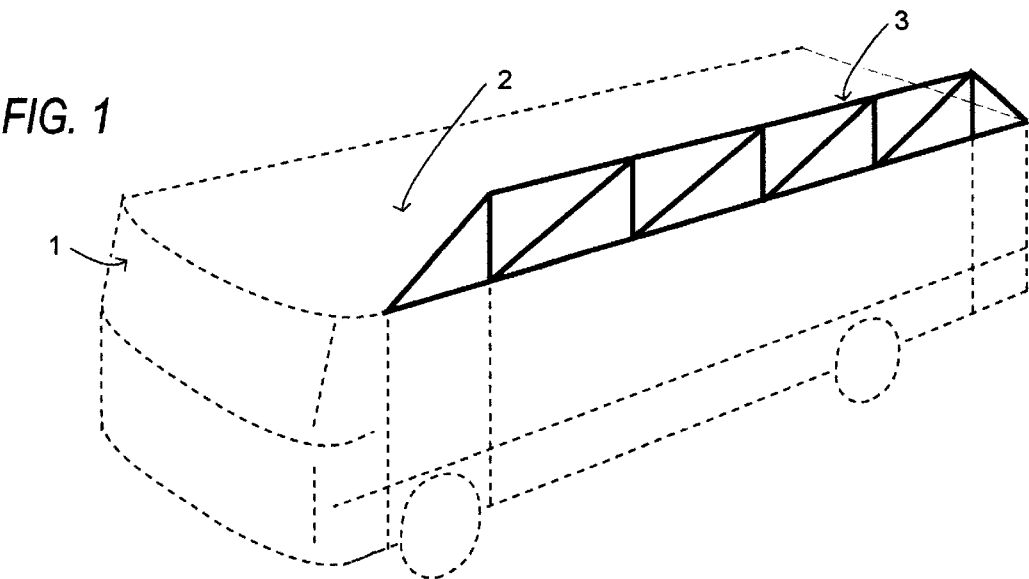
FIG. 1 is a perspective view of one embodiment of the invention depicting a representative rooftop truss stiffening structure (shown in solid line) spanning the length of one side of a vehicle depicted upon a typical recreational vehicle (motorhome shown in broken line).

FIG. 1 is a perspective view of one embodiment of the invention depicting a typical vehicle 1 (shown in broken line), upon which vehicle roof 2 is shown a representative rooftop truss stiffening structure 3 (shown in solid line) spanning the length of one side of a vehicle. The truss is integral to the roof structure, and acts as an extremely large I-beam carrying the roof load between the end-points of the truss. The truss configuration is used to illustrate the above-the-roof span structure, but stressed panels, I-beam, stressed skin, monocoque structures, or other suitable above-the-roof structures similarly stiffening the roof are within the scope of the invention. Any suitable material may be used, including, but not limited to, metal, plastics, fiberglass, and composites. The above-the-roof stiffening structure may be a separate truss as shown in this illustration, or the roof load may be similarly carried in vertical sections of a monocoque rooftop structure or an above-the-roof extended sidewall of the vehicle resulting in an above-the-roof stiffening structure. The number and types of elements shown depict a typical assembly, whereas specific assemblies may omit, add, or modify elements as suitable for application to the intended vehicle.

Figure 2:
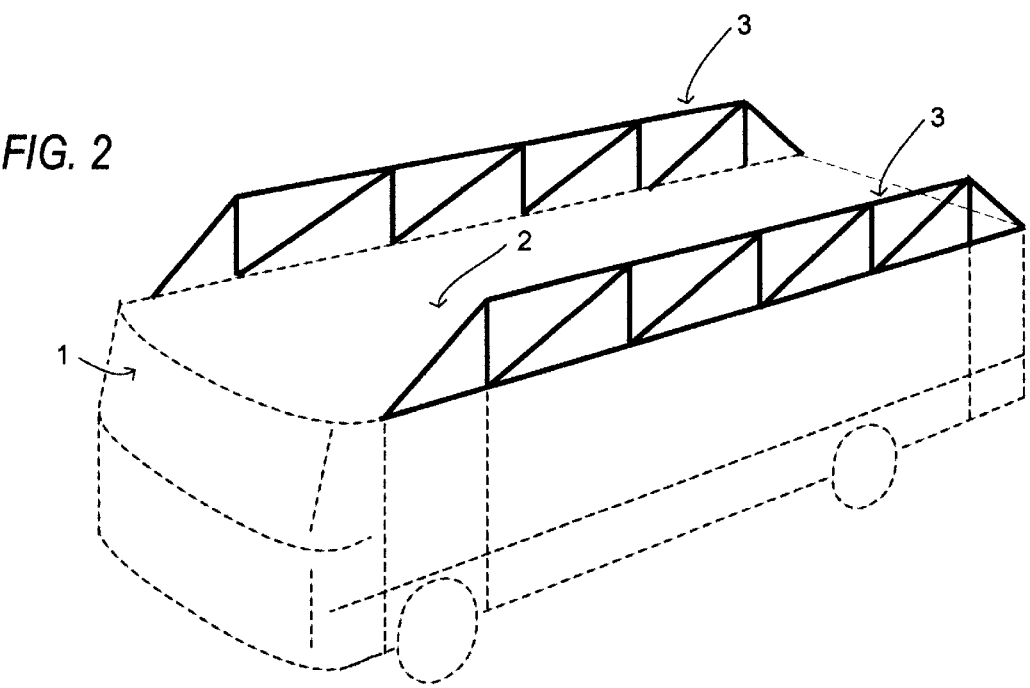
FIG. 2 is the same perspective view as FIG. 1, with the addition of a second rooftop truss stiffening structure (shown in solid line) spanning the length of the other side of a vehicle on a typical recreational vehicle (motorhome shown in broken line).

FIG. 2 is the same perspective view as FIG. 1, with the addition of a second rooftop truss stiffening structure spanning the length of the other side of a vehicle. The typical vehicle 1 (shown in broken line), upon which vehicle roof 2 is shown representative rooftop truss stiffening structures 3 (shown in solid line) spanning the length of each side of the vehicle. This drawing illustrates two above-the-roof stiffening structures along the outside edge of the vehicle roof. Within the scope of the invention, the stiffeners may be at the edge of the roof, they may set back from the edge of the vehicle, and the number of stiffeners may be of any amount.

Figure 3:
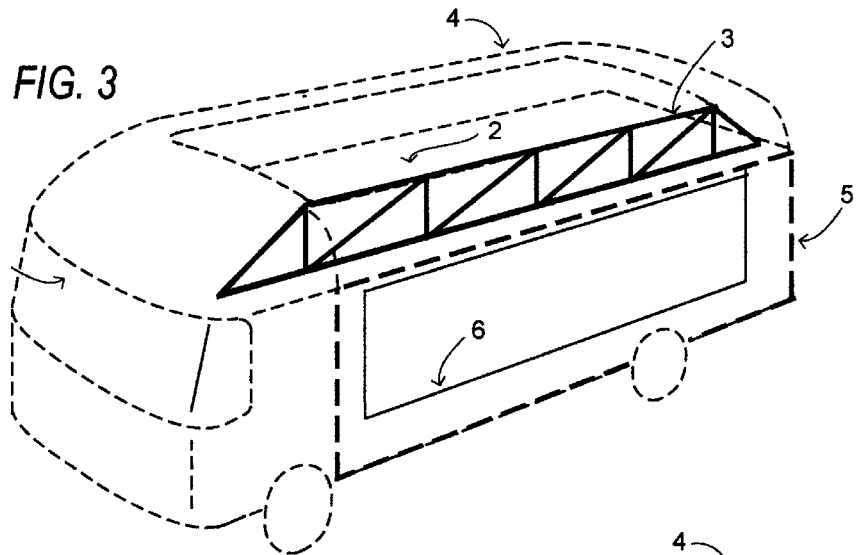
FIG. 3 is the same perspective view as FIG. 1 depicting the rooftop truss stiffening structure (shown in solid line) spanning the length of the side of a vehicle upon a typical recreational vehicle (motorhome shown in broken line), and additionally showing (in broken line) a rooftop cowling from my previous U.S. Pat. No. 6,237,988-STREAMLINE ROOFTOP DECK FOR MOTORHOMES and my allowed U.S. patent application Ser. No. 09/766,966-ROOFTOP DECK SYSTEMS FOR VEHICLES which conceals the truss system within the cowling.

FIG. 3 is the same perspective view as FIG. 2, with the addition of a rooftop cowling from my previous U.s. Pat. No.

6,237,988-STREAMLINE ROOFTOP DECK FOR MOTORHOMES and my allowed patent application Ser. No. 09/766,966-ROOFTOP DECK SYSTEMS FOR VEHICLES which said cowlings conceal the truss system within the cowling. The typical vehicle 1 is shown in broken line. Additionally shown (in broken line) is the rooftop cowling 4 upon the roof of the vehicle. And upon the vehicle roof 2 is shown representative rooftop truss stiffening structures 3 (shown in solid line) spanning the length of each side of the vehicle (the truss farthest from the reader is concealed within the cowling). For illustration purposes, the cowling closest to the reader is cut away to show the truss within the cowling. A heavy weight broken line 5 depicts the sidewall of the vehicle closest to the reader. Solid line 6 in the sidewall depicts the outline for cutting a hole in the sidewall for a typical slide-out. The bottom of the outline is at the interior floor level in the vehicle, the upper outline is at or near the lower surface of the ceiling within the vehicle, and the two end outlines are near the ends of the vehicle.

Figure 4:
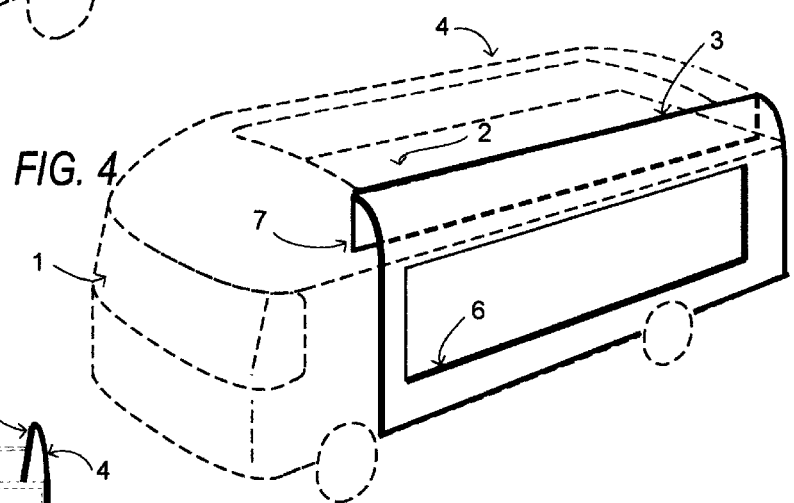
FIG. 4 is the same perspective view as FIG. 3, but depicting the rooftop stiffening structure as a monocoque stressed skin panel (shown in heavy solid line), spanning the length of the side of a vehicle upon a typical recreational vehicle with a rooftop cowling.

FIG. 4 is the same perspective view as FIG. 3, but instead of showing the truss as the stiffening for the roof, the stiffening is accomplished by a double wall monocoque cowling. The monocoque stressed panel 7 (shown in heavy solid line) spans the length of the side of a typical recreational vehicle. The typical vehicle 1 is shown in broken line. The vehicle roof 2 and the rooftop cowling 4 are also shown in broken line. The monocoque stressed panel 7 acts in the same manner as the truss stiffening structure 3 shown in FIG. 3. Solid line 6 in the sidewall similarly depicts the outline for cutting a hole in the sidewall.

Figure 5:
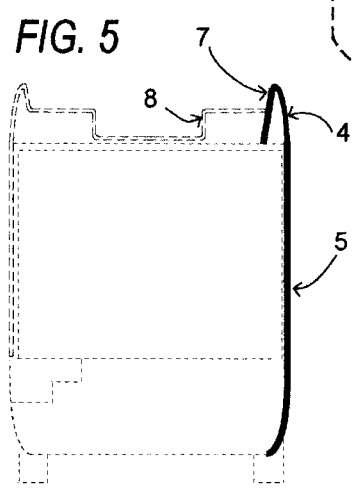
FIG. 5 is a midway cross-section of the FIG. 4 view through the typical vehicle and cowling, showing the relationship of the truss (monocoque) stiffening structure of the roof to the side of the vehicle.

FIG. 5 is a midway cross-section of the FIG. 4 view through the typical vehicle and cowling 4, showing the relationship of the monocoque stiffening panel structure 7 of the roof to the sidewall of the vehicle 5. In this embodiment, the inner monocoque panel 7 is stiffening the roof as well as the monocoque outer skin (panel) of the cowling 4, effectively resulting in the equivalent of two trusses. While the inner monocoque panel 7 is shown as being a panel, it is not necessary to be a flat panel, as it may be formed into a seat vertical back, a horizontal seat bottom, and a vertical seat base 8, while retaining the attributes of the above-the-roof monocoque stiffening structure, all of which shapes are within the scope of the invention.

Figure 6:
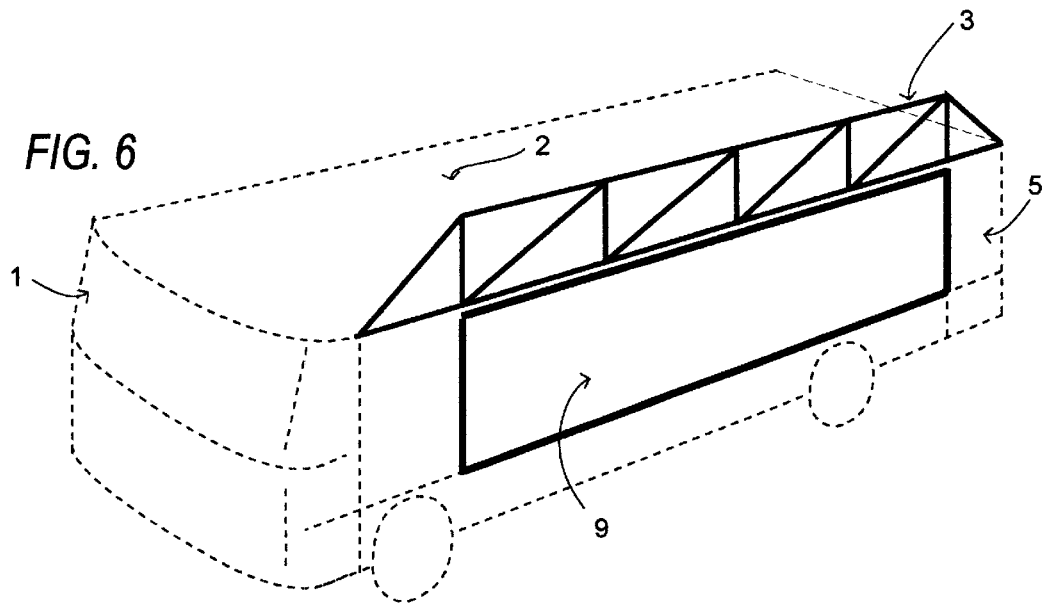
FIG. 6 is the same perspective view as FIG. 4 depicting the typical recreational vehicle in broken line (depicted without the rooftop cowling), and showing the rooftop truss (monocoque) in solid line, and also showing in solid line a nearly Full-Length Expanding Room Slide-Out in the retracted (closed) position within the vehicle.

FIG. 6 is the same perspective view as FIG. 1, with the addition of a nearly Full-Length Expanding Room Slide-Out shown in the sidewall of the vehicle. The typical vehicle 1 (shown in broken line), upon which vehicle roof 2 is shown the representative rooftop truss stiffening structure 3 (shown in solid line) as spanning the length of the vehicle. (Note ... where the rooftop truss is employed, instead of the monocoque cowling, the truss is hidden from view within the rooftop cowling.) In the sidewall 5 of the vehicle is shown the nearly Full-Length Expanding Room Slide-Out 9 (in solid line) in the closed position. The Slide-Out 9 may be proportionally longer or shorter relative to the vehicle within the scope of the invention.

Figure 7:
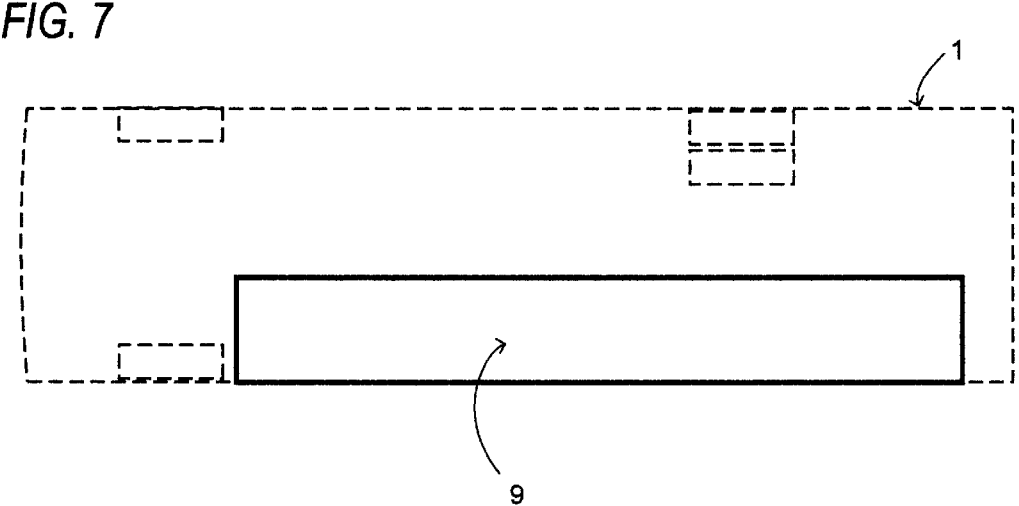
FIG. 7 is a top plan view of FIG. 6 showing the same vehicle (in broken line) and showing in solid line the plan view of the nearly Full-Length Expanding Room Slide-Out in the retracted (closed) position within the vehicle.

FIG. 7 is a top plan view of the same vehicle of FIG. 6 showing the plan view of a nearly Full-Length Expanding Room Slide-Out 9 (solid line) in the retracted (closed) position within the vehicle. The typical vehicle 1 plan view is shown in broken line. The plan view (top view) of the nearly Full-Length Expanding Room Slide-Out 9 is shown in solid line. The Slide-Out 9 is shown in the retracted (closed) position, with the exterior wall of the Slide-Out being substantially flush with the exterior sidewall of the vehicle. Since no below-the-roof pillar or structure is required to hold the weight of the roof (and its rooftop occupants), a single long one-piece Slide-Out can be used in the vehicle.

Figure 8:
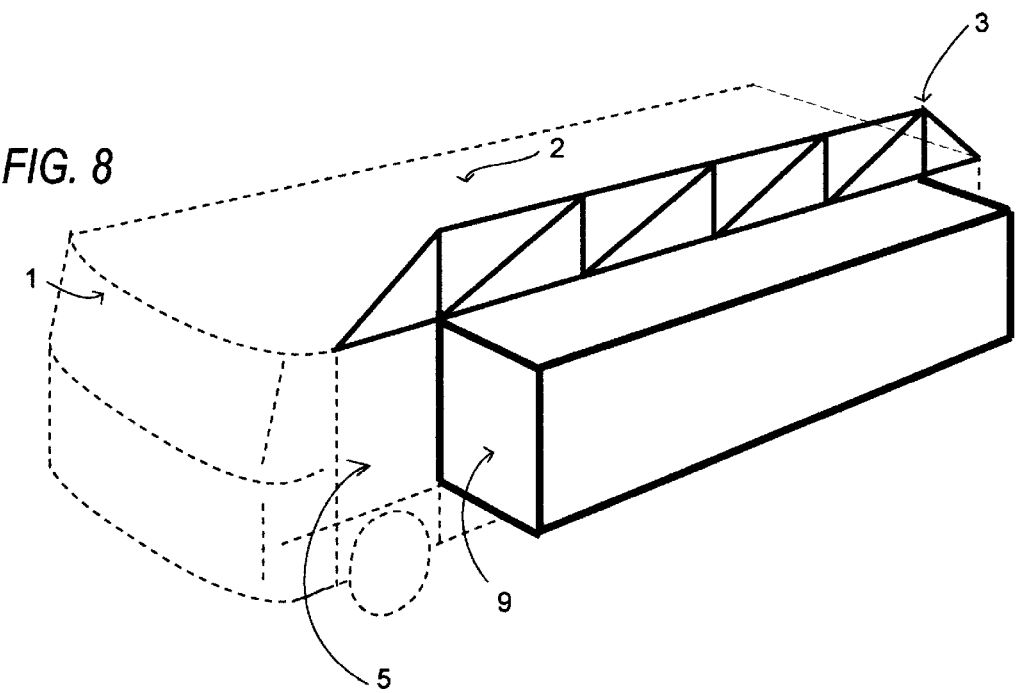
FIG. 8 is the same perspective view as FIG. 4 depicting the typical recreational vehicle in broken line (depicted without the rooftop cowling), and showing the rooftop truss (monocoque) in solid line, and also showing in solid line a nearly Full-Length Expanding Room Slide-Out in the expanded (open) position within the vehicle.

FIG. 8 is the same perspective view as FIG. 6 depicting the nearly Full-Length Expanding Room Slide-Out (shown in solid line) in the expanded "open" position protruding from the vehicle. The typical vehicle 1 (shown in broken line), upon which vehicle roof 2 is shown representative rooftop truss stiffening structure 3 (shown in solid line) spanning the length of the vehicle. In the sidewall 5 of the vehicle is shown the nearly Full-Length Expanding Room Slide-Out 9 (in solid line) in the expanded "open" position. The slide-out operation is accomplished with commonly available RV slide-out hardware.

Figure 9:
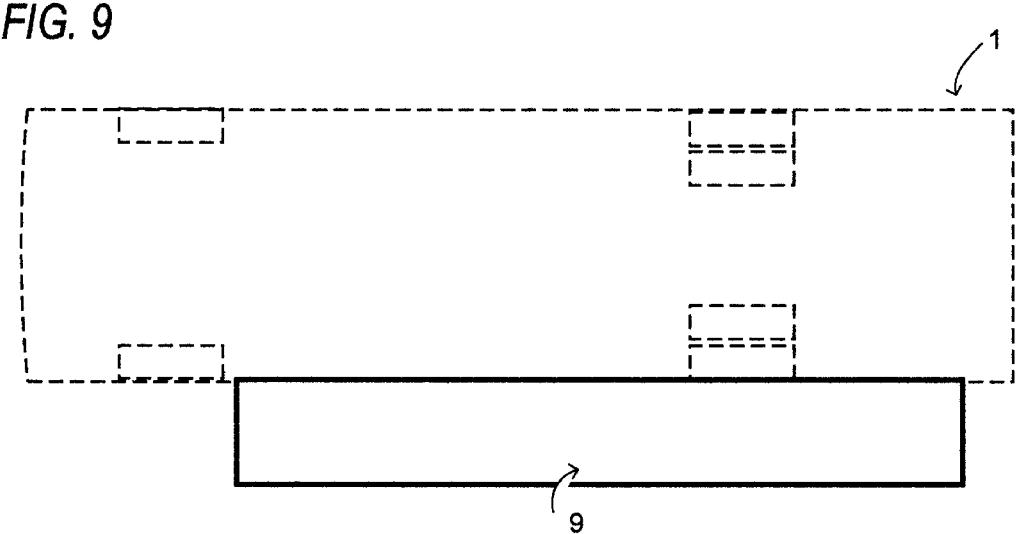
FIG. 9 is a top plan view of FIG. 7 showing the same vehicle (in broken line) and showing in solid line the plan view of the nearly Full-Length Expanding Room Slide-Out in the expanded (open) position within the vehicle.

FIG. 9 is the same top plan view as the FIG. 7 showing the plan view of the nearly Full-Length Expanding Room Slide-Out in the expanded "open" position protruding from the vehicle. The typical vehicle 1 plan view is shown in broken line. The plan view of the nearly Full-Length Expanding Room Slide-Out 9 is shown in solid line. The Slide-Out 9 is shown in the expanded "open" position, thus substantially increasing the interior volume of the vehicle. For illustration simplicity, the vehicle is shown with the nearly Full-Length Expanding Room Slide-Out on only one side of the vehicle. Within the scope of this invention, a second nearly Full-Length Expanding Room Slide-Out may be utilized on the other side of the vehicle, or any number of smaller Slide-Outs may be utilized in combination with the Full-Length Expanding Room Slide-Out.

Figure 10:
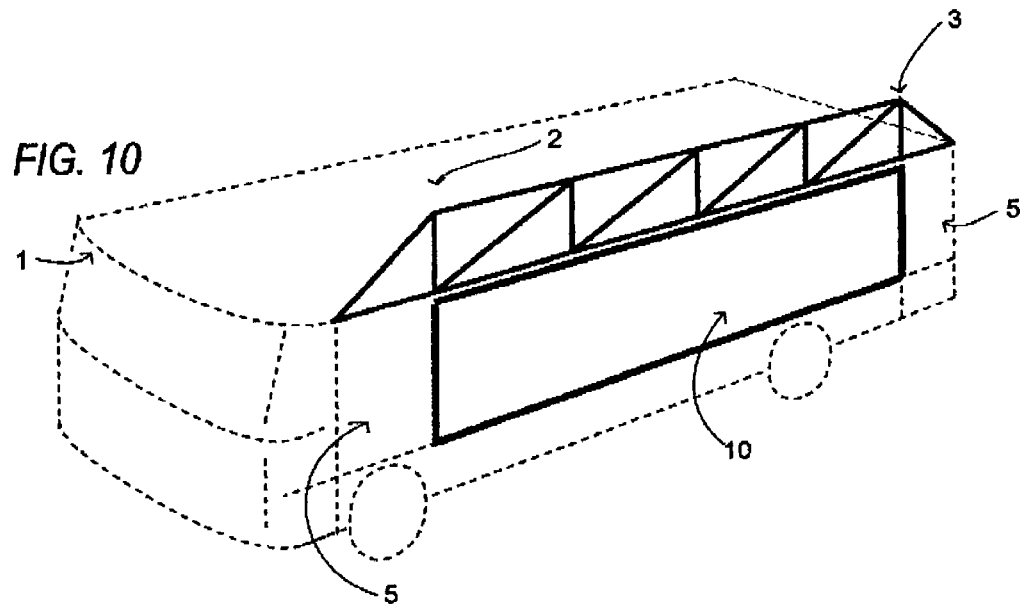
FIG. 10 is the same perspective view as FIG. 6 depicting the typical recreational vehicle in broken line (depicted without the rooftop cowling), and showing the rooftop truss (monocoque) in solid line, and also showing in solid line a nearly Full-Length Fan-Shaped Expanding Room Slide-Out in the retracted (closed) position within the vehicle.

FIG. 10 is the same perspective view as FIG. 6 depicting the typical recreational vehicle (without the rooftop cowling) and showing in solid line the rooftop truss (monocoque) and a nearly Full-Length Fan-Shaped Expanding Room Slide-Out (shown in solid line) in the retracted "closed" position within the vehicle. The typical vehicle 1 (shown in broken line), upon which vehicle roof 2 is shown representative rooftop truss stiffening structure 3 (shown in solid line) spanning the length of the vehicle. In the sidewall 5 of the vehicle is shown the nearly Full-Length Fan-Shaped Expanding Room Slide-Out 10 (in solid line) in the closed position. The Fan Shaped Slide-Out 10 may be proportionally longer or shorter relative to the vehicle within the scope of the invention.

Figure 11:
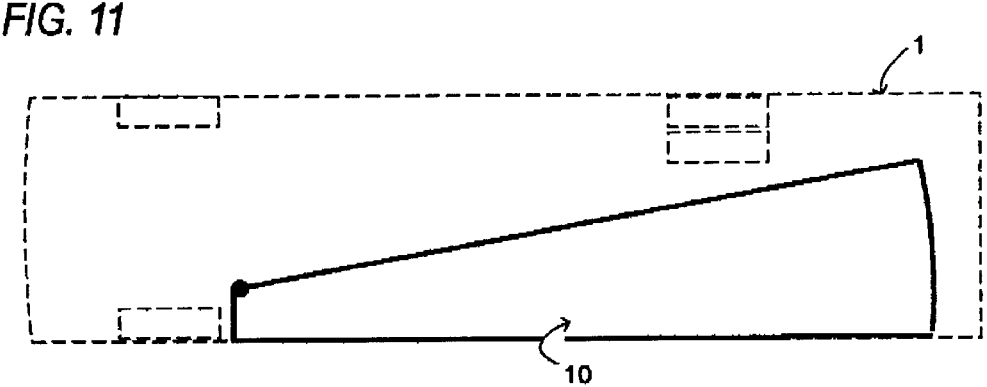
FIG. 11 is a top plan view of FIG. 10 showing the same vehicle (in broken line) and showing in solid line the plan view of the nearly Full-Length Fan-Shaped Expanding Room Slide-Out in the retracted (closed) position within the vehicle.

FIG. 11 is a top plan view of the typical vehicle of FIG. 10 showing the plan view of a nearly Full-Length Fan-Shaped Expanding Room Slide-Out in the retracted "closed" position within the vehicle. The typical vehicle 1 plan view is shown in broken line. The plan view of the nearly Full-Length Fan-Shaped Expanding Room Slide-Out 10 is shown in solid line. The Full-Length Fan-Shaped Expanding Room Slide-Out 10 is shown in the retracted "closed" position, with the exterior wall of the Full-Length Fan-Shaped Expanding Room Slide-Out being substantially flush with the exterior sidewall of the vehicle. Since no below-the-roof pillar or structure is required to hold the weight of the roof (and its rooftop occupants), a single long one-piece Full-Length Fan-Shaped Expanding Room Slide-Out can be used in the vehicle.

Figure 12:
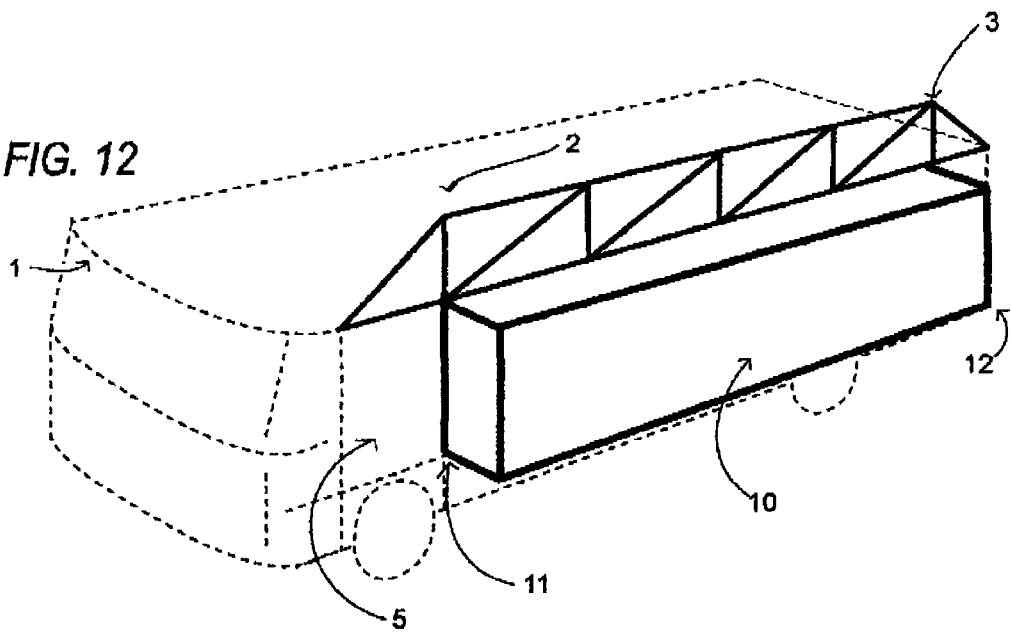
FIG. 12 is the same perspective view as FIG. 10 depicting the typical recreational vehicle in broken line (depicted without the rooftop cowling), and showing the rooftop truss (monocoque) in solid line, and also showing in solid line a nearly Full-Length Fan-Shaped Expanding Room Slide-Out in the partially expanded (part open) position within the vehicle.

FIG. 12 is the same perspective view as FIG. 10 depicting the typical recreational vehicle (without the rooftop cowling), and showing in solid line the rooftop truss (monocoque) and the nearly Full-Length Fan-Shaped Expanding Room Slide-Out 10 (shown in solid line) in the partially expanded "part open" position protruding from the vehicle. The typical vehicle 1 (shown in broken line), upon which vehicle roof 2 is shown representative rooftop truss stiffening structure 3 (shown in solid line) spanning the length of the vehicle. In the sidewall 5 of the vehicle is shown the nearly Full-Length Fan-Shaped Expanding Room Slide-Out 10 (in solid line) in the partially expanded "part open" position. The slide-out operation to the partially expanded position is accomplished with commonly available RV slide-out hardware.

Figure 13:
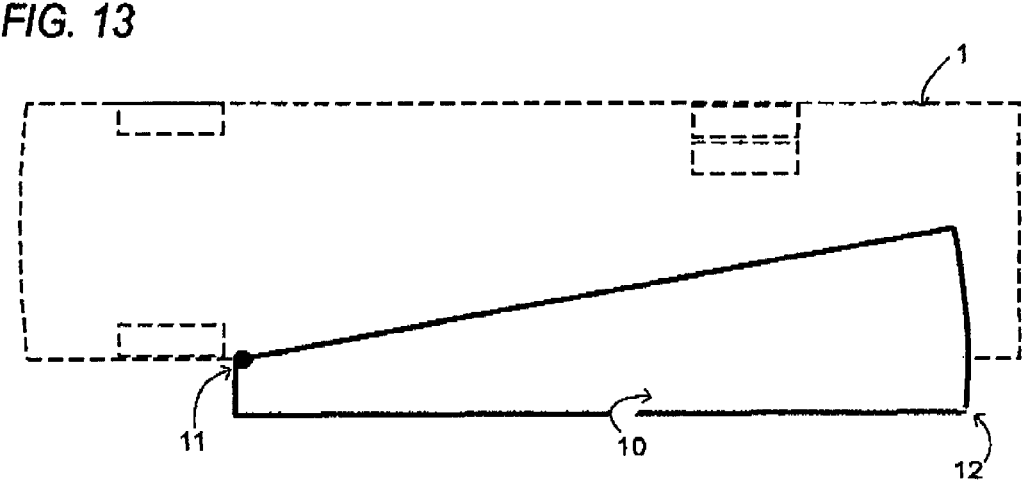
FIG. 13 is a top plan view of FIG. 12 showing the same vehicle (in broken line) and showing in solid line the plan view of the nearly Full-Length Fan-Shaped Expanding Room Slide-Out in the partially expanded (part open) position within the vehicle.

FIG. 13 is the same top plan FIG. 11 view of the typical vehicle showing the plan view of the nearly Full-Length Fan-Shaped Expanding Room Slide-Out in the a partially expanded "part open" position protruding from the vehicle. The typical vehicle 1 plan view is shown in broken line. The plan view of the nearly Full-Length Fan-Shaped Expanding Room Slide-Out 10 is shown in solid line. The Fan Shaped Slide-Out 10 is shown in the partially expanded "part open" position to illustrate the first stage of room expansion where the sidewall of the Fan Shaped Slide-Out remains substantially parallel to the sidewall of the vehicle. For illustration simplicity, the vehicle is shown with the nearly Full-Length Fan-Shaped Expanding Room Slide-Out on only one side of the vehicle. Within the scope of this invention, a second nearly Full-Length Fan-Shaped Expanding Room Slide-Out may be utilized on the other side of the vehicle, or any number of smaller Slide-Outs maybe utilized in combination with the Full-Length Fan-Shaped Expanding Room Slide-Out.

Figure 14:
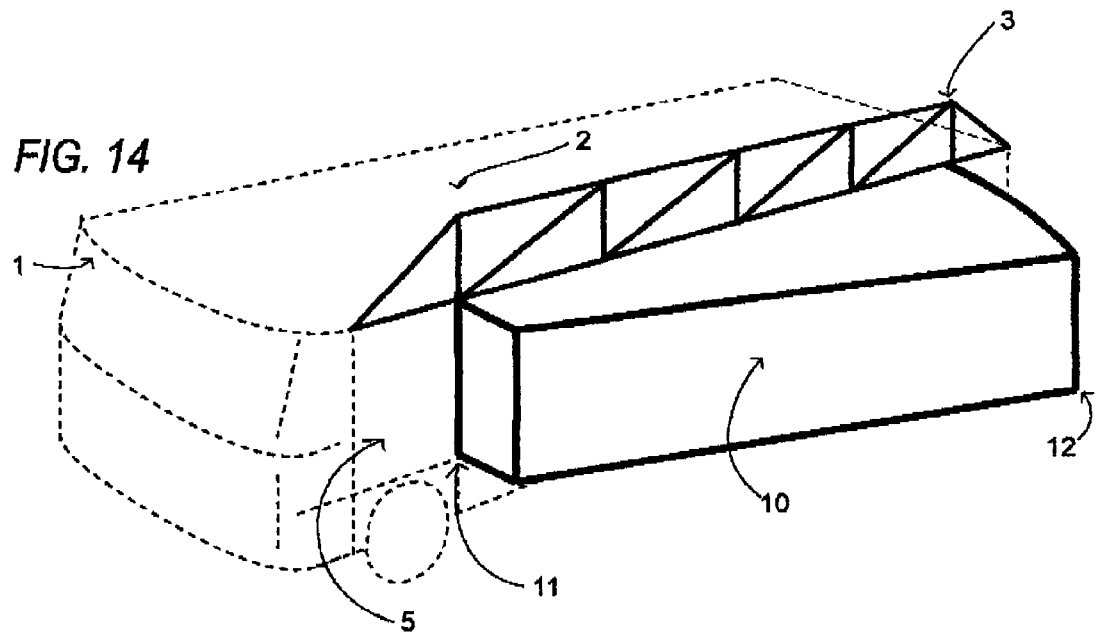
FIG. 14 is the same perspective view as FIG. 12 depicting the typical recreational vehicle in broken line (depicted without the rooftop cowling), and showing the rooftop truss (monocoque) in solid line, and also showing in solid line a nearly Full-Length Fan-Shaped Expanding Room Slide-Out in the fully expanded (full open) position within the vehicle.

FIG. 14 is the same perspective view as FIG. 12 depicting the typical recreational vehicle (without the rooftop cowling), and showing in solid line the rooftop truss (monocoque) and the nearly Full-Length Fan-Shaped Expanding Room Slide-Out 10 in the fully expanded "full open" position protruding from the vehicle. The typical vehicle 1 (shown in broken line), upon which vehicle roof 2 is shown the representative rooftop truss 3 (shown in solid line) stiffening structure that is spanning the length of the vehicle. In the sidewall 5 of the vehicle is shown the nearly Full-Length Fan-Shaped Expanding Room Slide-Out 10 (in solid line) in the fully expanded "full open" position. In operation, after the Fan Shaped Slide-Out reaches the partially open position shown in FIG. 12, the operation of the conventional RV slide-out hardware differs as follows: The forward inside end of the Fan Shaped Slide-Out 11 is pivotally attached to the end of the forward conventional RV slide-out track. The rear outside end of the Fan Shaped Slide-Out 12 is pivotally attached to the end of the rear conventional RV slide-out track. Intermediate RV slide-outs are similarly pivotally attached to the outside bottom structure of the Fan Shaped Slide-Out. The forward RV slide-out ends its travel at the partially open position shown in FIG. 12. The rearmost RV slide-out continues its travel, which causes the Fan Shaped Slide-Out to pivot at its forward end thus rotating the rear end of the Fan Shaped Slide-out upon the forward pivot axis. The rear RV slide-out continues its extension until the rear of the Fan Shaped Slide-Out reaches its fully expanded "full open" position. The reverse operation closes the Fan Shaped Slide-Out.

Figure 15:
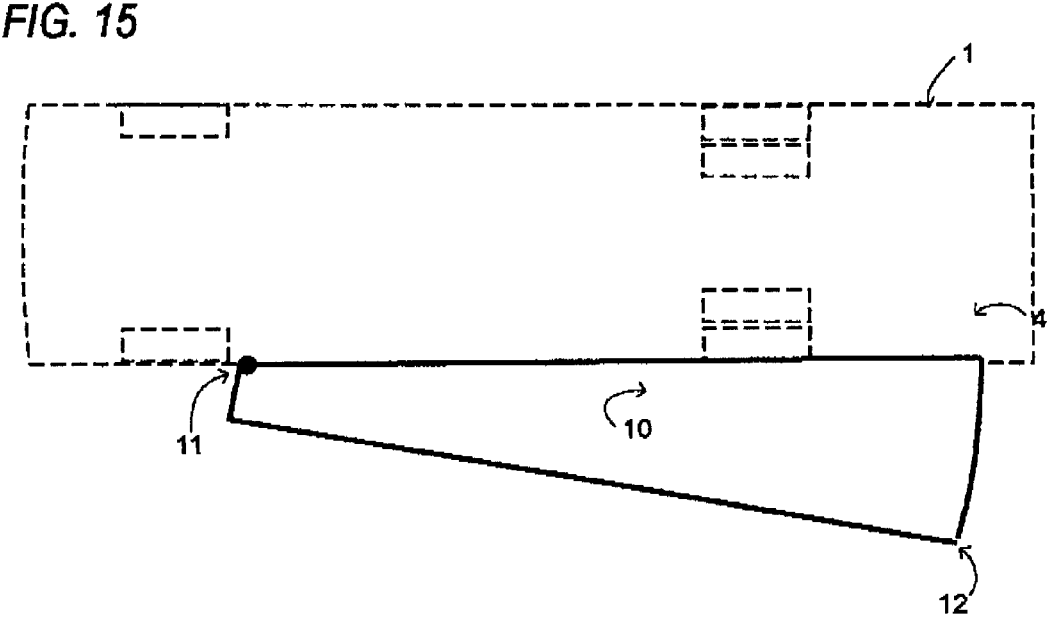
FIG. 15 is a top plan view of FIG. 13 showing the same vehicle (in broken line) and showing in solid line the plan view of the nearly Full-Length Fan-Shaped Expanding Room Slide-Out in the fully expanded (full open) position within the vehicle.

FIG. 15 is the same top plan FIG. 13 view of the typical vehicle (in broken line) showing the plan view of the nearly Full-Length Fan-Shaped Expanding Room Slide-Out (shown in solid line) in the fully expanded "full open" position protruding from the vehicle.

Figure 16:
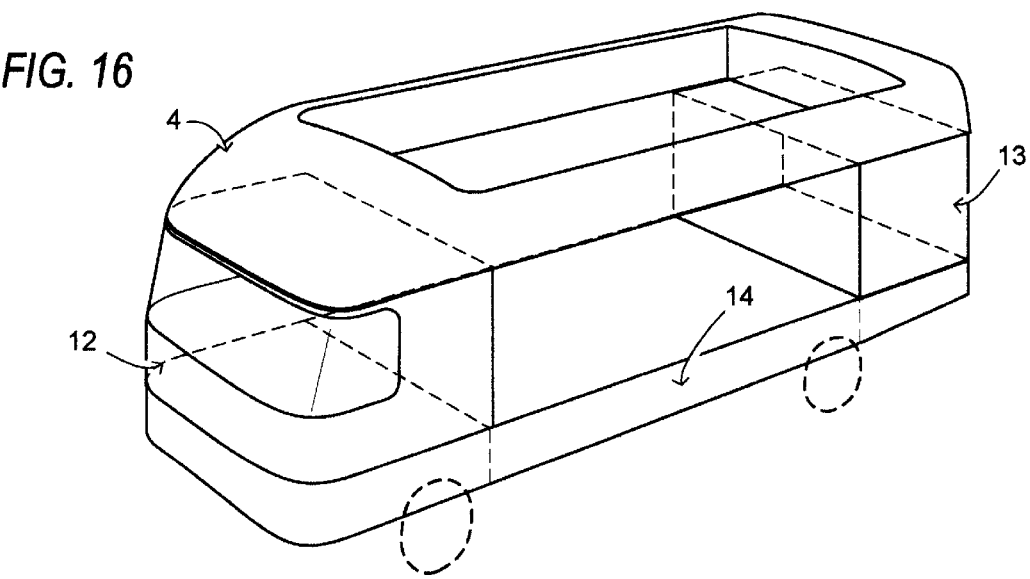
FIG. 16 is the same perspective view as FIG. 1, but depicting the typical recreational vehicle with the rooftop monocoque cowling (from my previous U.S. Pat. No. 6,237,988—STREAMLINE ROOFTOP DECK FOR MOTORHOMES and my allowed U.S. patent application Ser. No. 09/766,966 ROOFTOP DECK SYSTEMS FOR VEHICLES) shown in another embodiment of the invention as a Roof-cowled Unitized Modular Monocoque Construction System where the invention's roof system and the vehicle body consist of a multitude of modular monocoque units.

FIG. 16 is the same perspective view as FIG. 1, but depicting the typical recreational vehicle with the rooftop monocoque cowling (from my previous U.S. Pat. No. 6,237,988—STREAMLINE ROOFTOP DECK FOR MOTORHOMES and my allowed patent application Ser. No. 09/766,966—ROOFTOP DECK SYSTEMS FOR VEHICLES) shown in another embodiment of the invention as a Roof-cowled Unitized Modular Monocoque Construction System where the invention's roof system and the vehicle body consist of a multitude of modular monocoque units. In the perspective FIG. 16, the monocoque cowling roof unit 4 (a Monocoque Roof-cowled Component) is shown atop a Monocoque Front-Cab Component 12 and atop a Monocoque Rear-Cab Component 13. The Monocoque Front-Cab Component and the Monocoque Rear-Cab Component are shown atop a Monocoque Drive-Deck Component 14. In this embodiment of the invention, assembly of the Components yields a Roof-cowled Unitized Modular Monocoque Construction RV vehicle body that does not require structural sidewalls between the front and rear cabs to carry the roof load weight. This embodiment thus allows for utilization of the invention's Full-Length Expanding Room Slide-Outs and Full-Length Fan-Shaped Expanding Room Slide-Outs. The number and types of Monocoque Components and Elements shown depict a typical assembly, whereas specific assemblies may omit, add, or modify Components and Elements as suitable for application to the intended vehicle.

Figure 17:
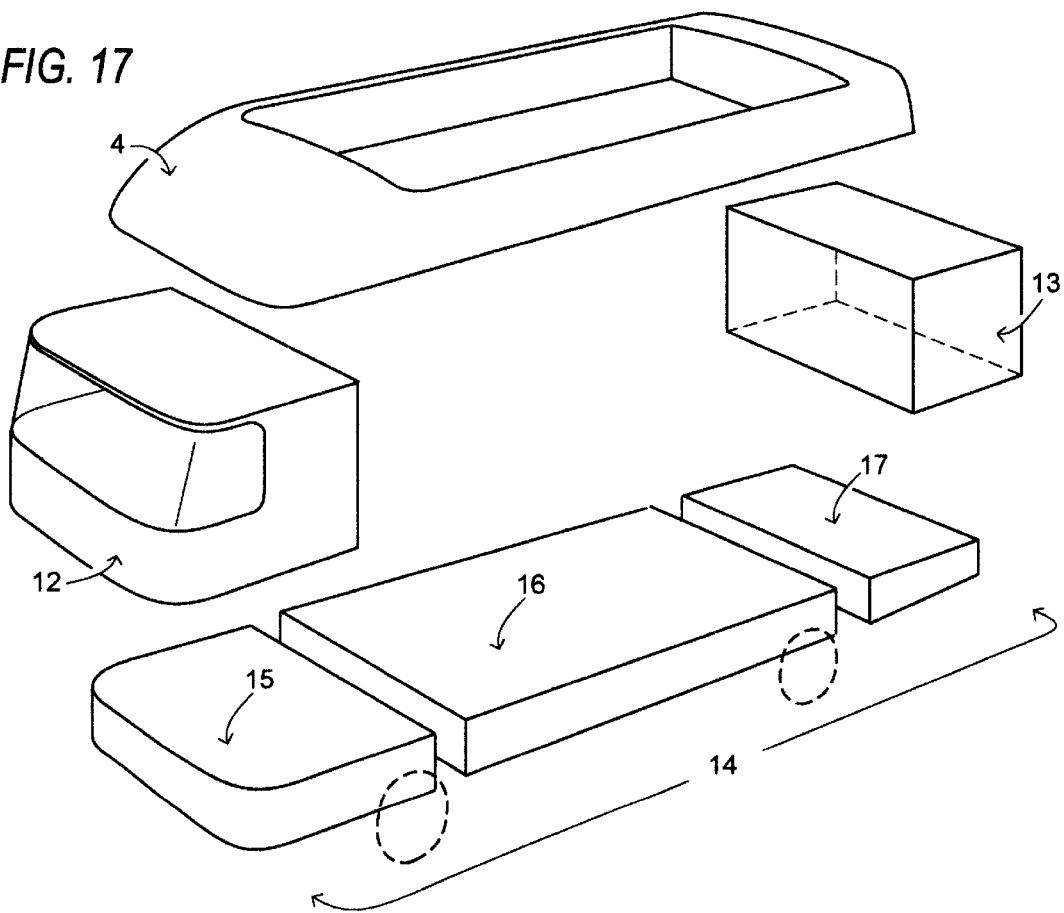
FIG. 17 is the same perspective view as FIG. 16 depicting the Roof-cowled Unitized Modular Monocoque Construction in an exploded view, showing the Monocoque Roof-cowled Component, a Monocoque Front-Cab Component, a Monocoque Rear-Cab Component, and with a Monocoque Drive-Deck Component shown as three elements.

FIG. 17 is the same perspective view as FIG. 16 depicting the Roof-cowled Unitized Modular Monocoque Construction in an exploded view, showing the Monocoque Roof-cowled Component 4, a Monocoque Front-Cab Component 12, a Monocoque Rear-Cab Component 13, and with a Monocoque Drive-Deck Component 14 shown as three elements: a Front Power-Bay 15, a Center Storage-Bay 16, and a Rear Power-Bay 17.

Figure 18:
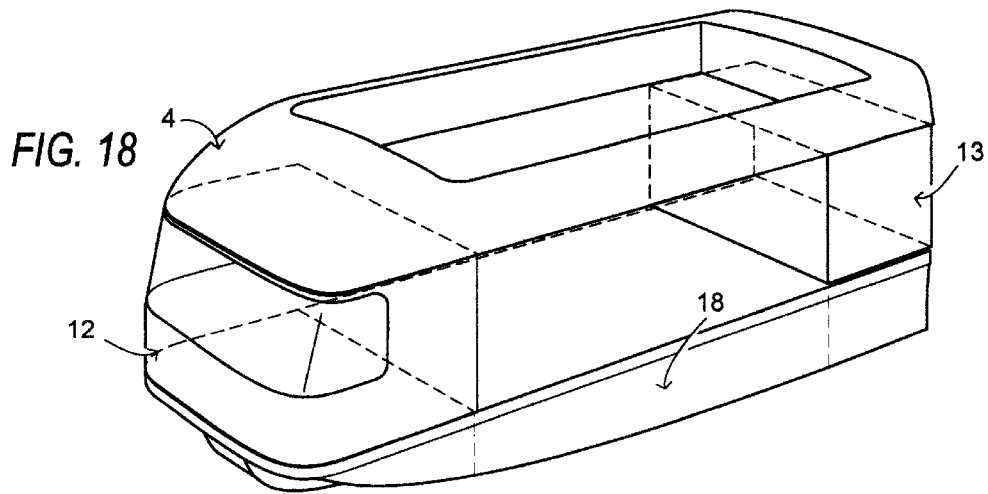
FIG. 18 is the same perspective view as FIG. 16 depicting the Roof-cowled Unitized Modular Monocoque Construction and with the wheeled Drive-Deck Component replaced with a Monocoque Amphibious-Deck Component.

FIG. 18 is the same perspective view as FIG. 16 depicting the Roof-cowled Unitized Modular Monocoque Construction, but with the wheeled Drive-Deck Component replaced with a Monocoque Amphibious-Deck Component 18. The resulting vehicle form is a Roof-cowled Unitized Modular Monocoque Construction Amphibious Vehicle when equipped with wheels. When not equipped with wheels, the resulting vehicle is a Roof-cowled Unitized Modular Monocoque Construction watercraft.

Figure 19:
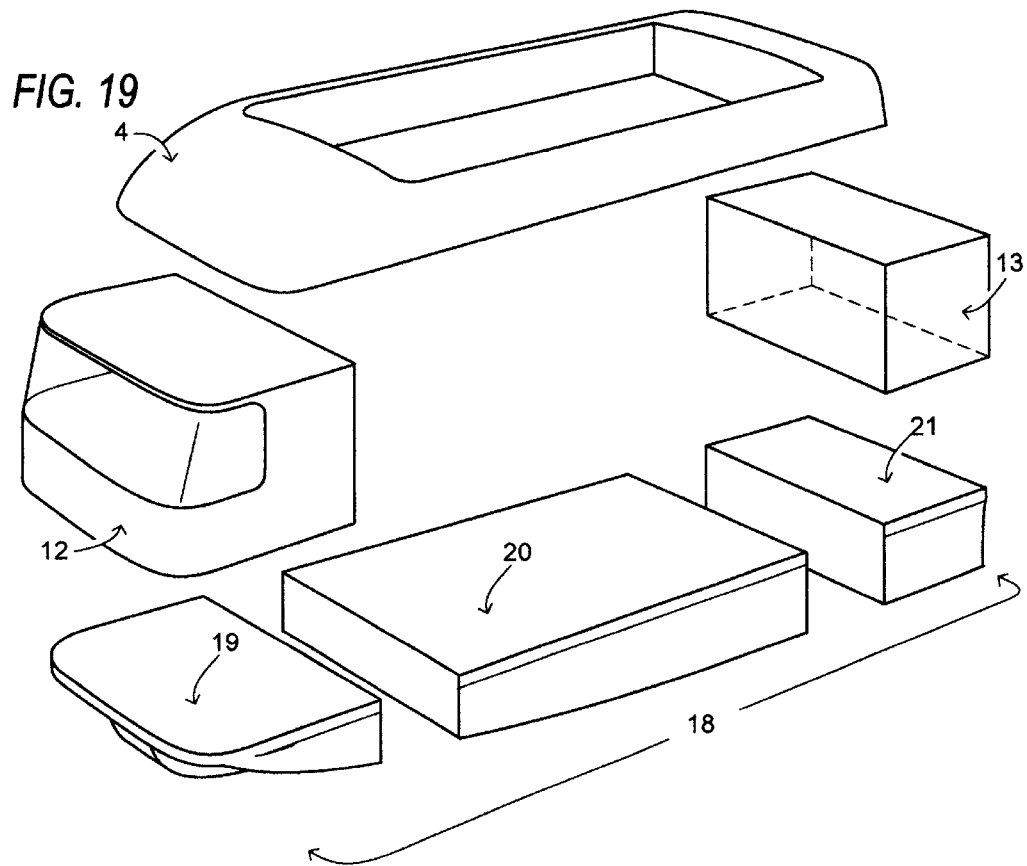
FIG. 19 is the same perspective view as FIG. 18 depicting the Roof-cowled Unitized Modular Monocoque Construction in an exploded view, showing the Monocoque Roof-cowled Component, the Monocoque Front-Cab Component, the Monocoque Rear-Cab Component, and with the Monocoque Amphibious-Deck Component shown as three elements.

FIG. 19 is the same perspective view as FIG. 18 depicting the Roof-cowled Unitized Modular Monocoque Construction in an exploded view, showing the Monocoque Roof-cowled Component 4, the Monocoque Front-Cab Component 12, the Monocoque Rear-Cab Component 13, and with the Monocoque Amphibious-Deck Component 18 shown as three elements: a Bow Power-Bay 19, a Hull-Bay 20, and a Stem Power-Bay 21.

Figure 20:
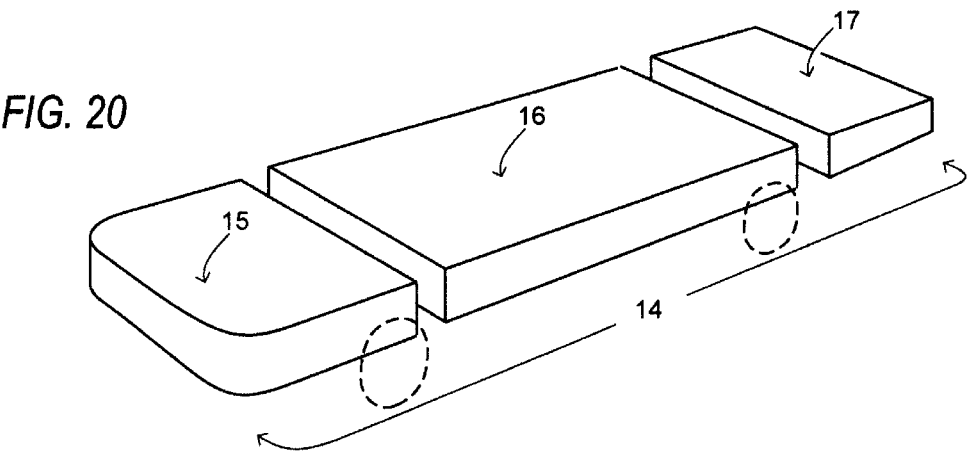
FIG. 20 is the same perspective view as FIG. 17 depicting the Monocoque Drive-Deck Component shown in the three elements of a Front Power-Bay, a Center Storage-Bay, and a Rear Power-Bay.

FIG. 20 is the same perspective view as FIG. 17, but only depicting the Monocoque Drive-Deck Component 14 shown in the three elements of the Front Power-Bay 15, the Center Storage-Bay 16, and the Rear Power-Bay 17.

Figure 21:
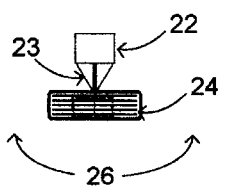
FIG. 21 is a schematic top view of a Universal-Motor Power Suspension Module showing the tire in the straight-ahead-position.

FIG. 21 is a schematic top view of a non-steering Universal-Motor Power Suspension Module 26 showing the tire in the straight-ahead-position. The Universal-Motor Power Suspension Module is comprised of an Electric Motor Assembly 22, a Double Wishbone Suspension Wheel Assembly 23, and a Tire 24. The Electric Motor Assembly 22 consists of an electric motor with regenerative-braking service, a disc brake, and an AC-DC converter. The Electric Motor Assembly is affixed to a base anchor structure of the Double Wishbone Suspension Wheel Assembly 23. The electric motor output shaft is connected to a universal jointed drive-line in the Double Wishbone Suspension Wheel Assembly 23. The Double Wishbone Suspension Wheel Assembly 23 consists of: the base anchor structure which affixes to the vehicle that also houses the Electric Motor Assembly 22, an upper and a lower suspension A-arm pivotally affixed to a rotating axle spindle, a spring and spring dampener (shock absorber), a drive shaft with universal joints at each end, and a wheel to affix a tire 24. The same Universal-Motor Power Suspension Module is used at all sides and ends of a vehicle, so as only one type of module is required to construct a vehicle with three or more wheels. When used as a steerable wheel, the steering link between opposing wheels on each side of a vehicle are linked to the steering system. When non-steering wheels are utilized, a link is attached between the wheel steering attachment point and an attachment point on the suspension A-arm to immobilize the spindle. When non-motor driven suspension is utilized the Electric Motor Assembly 22 and the drive shaft are eliminated.

Figure 22:
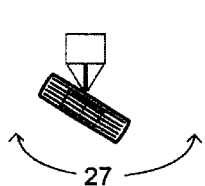
FIG. 22 is the same view as FIG. 21 depicting the Universal-Motor Power Suspension Module, but showing the tire in the turned-position.

FIG. 22 is the same view as FIG. 21 depicting the Universal-Motor Power Suspension Module, but showing the unit as a "steering" Universal-Motor Power Suspension Module 27.

Figure 23:
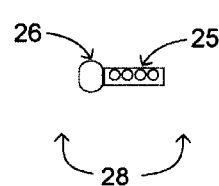
FIG. 23 is a schematic top view of a Universal-Electrical Generator Module.

FIG. 23 is a schematic top view of a Universal-Electrical Generator Module. The Universal-Electrical Generator Module 28 is a conventional Genset consisting of an internal combustion engine (piston, turbine, rotary combustion engine, or other type as suitable to turn a generator) 25 operating an electrical generating unit 26 (DC generator, alternator, or other type generating source suitable to produce electric current) to operate the Universal-Motor Power Suspension Modules.

Figure 24:
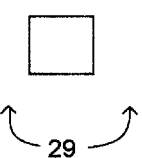
FIG. 24 is a schematic top view of a Systems Control Unit.

FIG. 24 is a schematic top view of a Systems Control Unit. The Systems Control Unit 29 manages the operation of the Universal-Electrical Generator Modules (1 or more), the Universal-Motor Power Suspension Modules (1 or more), and the auxiliary elements of the drive system.

Figure 25:
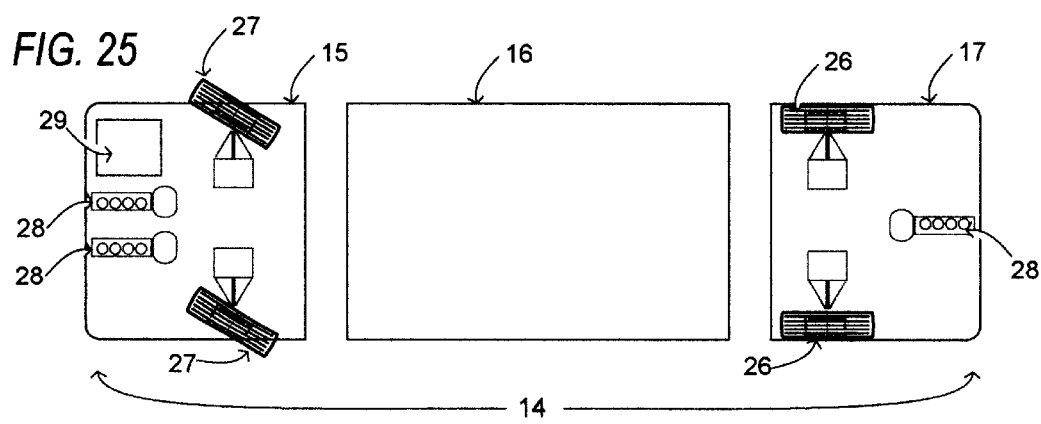
FIG. 25 is a schematic top view of the Monocoque Drive-Deck Component shown in the three elements of the Front Power-Bay, the Center Storage-Bay, and the Rear Power-Bay as depicted in FIG. 20, and showing an embodiment of the FIGS. 21, 22, 23, and 24 within the bays.

FIG. 25 is a schematic top view of the Monocoque Drive-Deck Component 14 shown in the three elements of the Front Power-Bay 15, the Center Storage-Bay 16, and the Rear Power-Bay 17 as depicted in FIG. 20, and showing an embodiment of the FIGS. 21, 22, 23, and 24 within the bays. Shown in the Front Power-Bay 15 are two Universal-Electrical Generator Modules 28, two steering Universal-Motor Power Suspension Modules 27, and one Systems Control Unit 29. The Center Storage-Bay 16 is suitable for battery packs, fuel storage, accessories, and general storage. In the Rear Power-Bay 17 is shown one Universal-Electrical Generator Module 28, and two non-steering Universal-Motor Power Suspension Modules 26. This embodiment of the assembled drive modules demonstrates an electric drive system with multiple Generator Modules and with a 4-wheel drive front steering configuration.

FIG. 26 is the same view as FIG. 25 depicting the Monocoque Drive-Deck Component 14, but configured with one Generator Module and all-wheel drive and all-wheel steering. Shown in the Front Power-Bay 15 is one Universal-Electrical Generator Module 28, two steering Universal-Motor Power Suspension Modules 27, and one Systems Control Unit 29. The Center Storage-Bay 16 is suitable for battery packs, fuel storage, accessories, and general storage. In the Rear Power-Bay 17 are shown two steering Universal-Motor Power Suspension Modules 27. This embodiment of the assembled drive modules demonstrates an electric drive system with one Generator Module and with a 4-wheel drive all-steering configuration.

FIG. 27 is the same view as FIG. 25 depicting the Monocoque Drive-Deck Component 14, but configured with two Generator Modules and all-wheel drive and front-wheel steering. Shown in the Front Power-Bay 15 are two Universal-Electrical Generator Modules 28, two steering Universal-Motor Power Suspension Modules 27, and one Systems Control Unit 29. The lengthened Center Storage-Bay 16 is suitable for battery packs, fuel storage, accessories, and general storage. In the Rear Power-Bay 17 is shown two non-steering Universal-Motor Power Suspension Modules 26. This embodiment of the assembled drive modules demonstrates an electric drive system with two Generator Modules and with a 4-wheel drive front-steering configuration.

FIG. 28 is the same view as FIG. 25 depicting the Monocoque Drive-Deck Component 14, but configured with three Generator Modules and 6-wheel drive with all-wheel steering. Shown in the Front Power-Bay 15 are two Universal-Electrical Generator Modules 28, two steering Universal-Motor Power Suspension Modules 27, and one Systems Control Unit 29. The lengthened Center Storage-Bay 16 is suitable for battery packs, fuel storage, accessories, and general storage, and is shown with two steering Universal-Motor Power Suspension Modules 27. In the Rear Power-Bay 17 are shown two steering Universal-Motor Power Suspension Modules 27 and one Universal-Electrical Generator Module 28. This embodiment of the assembled drive modules demonstrates an electric drive system with three Generator Modules and with an all-steering 6-wheel drive configuration.

FIG. 29 is the same view as FIG. 25 depicting the Monocoque Drive-Deck Component 14, but configured with five Generator Modules and 10-wheel drive with front-wheel steering. Shown in the Front Power-Bay 15 are two Universal-Electrical Generator Modules 28, two steering Universal-Motor Power Suspension Modules 27, and one Systems Control Unit 29. The lengthened Center Storage-Bay 16 is suitable for battery packs, fuel storage, accessories, and general storage, and is shown with two steering Universal-Motor Power Suspension Modules 27 and with four non-steering Universal-Motor Power Suspension Modules 26. In the Rear Power-Bay 17 is shown two non-steering Universal-Motor Power Suspension Modules 26 and three Universal-Electrical Generator Modules 28. This embodiment of the assembled drive modules demonstrates an electric drive system with five Generator Modules and with a front-steering 10-wheel configuration.

FIG. 30 is a side view of one application of FIGS. 16 & 18 depicting the Roof-cowled Unitized Modular Monocoque Construction System expressed as an Amphibious Motorhome (as claimed in my allowed patent application Ser. No. 09/766,966—ROOFTOP DECK SYSTEMS FOR VEHICLES), showing two steering Universal-Motor Power Suspension Modules 27 at the front of the vehicle (one per side), and six non-steering Universal-Motor Power Suspension Modules 26 at the rear (three per side). In this application, the Monocoque Roof-cowled Component 4, is atop the Monocoque Front-Cab Component 12 which has conventional vehicle windshields, and atop the Monocoque Rear-Cab Component 13 which has windows. The Monocoque Drive-Deck Component 14 is comprised of the Front Power-Bay 15, the Center Storage-Bay 16, and the Rear Power-Bay 17, flanked along both exterior sides with a Sponson 30 of the motorhome in the Closed Land Use configuration (locked to the sides of the vehicle by an actuator 31). The Sponsons in the Closed configuration substantially give the appearance of a conventional motorhome.

FIG. 31 is a mid-point cross section through the Amphibious Motorhome at the most forward of the rear tires as depicted in FIG. 30. In this application, the Monocoque Roof-cowled Component 4 is atop the Monocoque Rear-Cab Component 13, which is atop the Monocoque Amphibious-Deck Component 18. The Monocoque Amphibious-Deck Component 18 is flanked on each side with the Sponsons 30. This cross section shows the Sponsons in the Closed Land Use configuration, housing the non-steering Universal-Motor Power Suspension Modules 26 with road tires within the Sponsons 30. It also shows the Universal-Electrical Generator Module 28 within the Monocoque Amphibious-Deck Component 18 (as also shown in FIG. 18). In this embodiment of the Sponsons 30 (which have a multiplicity of lifting chines 38 on their inboard sponson surface), it can be seen how the Sponson chines interfit (mesh) with a similar multiplicity of lifting chines on the Monocoque Amphibious-Deck Component 18 exterior hull surfaces when the Sponsons 30 are in the closed position. The Sponsons 30 are hinged to the vehicle by Sponson Hinges 32, and are locked to the vehicle in the Closed Land Use configuration for land travel.

FIG. 32 is a typical interior floor plan of the Amphibious Motorhome depicted in FIG. 30, which shows a top view of the Sponson Hinges 32 where they are affixed to the body of the vehicle.

FIG. 33 is a side view of the same Amphibious Motorhome depicted in FIG. 30, exposing the the Monocoque Amphibious-Deck Component 18 for water use as previously depicted in FIG. 18. In this view, the Sponsons 30 are not shown to illustrate the watercraft configuration of the vehicle in the water. The Monocoque Roof-cowled Component 4 is shown with a folding rooftop Cowling Windshield 33 and a rooftop seating element 34 and a safety handrail element 35 from (from my previous U.S. Pat. No. 6,237,988—STREAMLINE ROOFTOP DECK FOR MOTORHOMES and my allowed patent application Ser. No. 09/766,966—ROOFTOP DECK SYSTEMS FOR VEHICLES) in their UP Position for use by occupants.

FIG. 34 is the same mid-point cross section through the Amphibious Motorhome at the most forward of the rear tires as depicted in cross section FIG. 31, but showing the non-steering Universal-Motor Power Suspension Modules 26 within the Sponsons 30 extended outward to form a cathedral hull configuration for water use as depicted in FIG. 33. The Cowling Windshield 33 is shown in the UP Position atop the Monocoque Roof-cowled Component 4. In this view, the Sponsons 30 are shown in the Up Position for water use. The Sponsons are locked in the Up Position by means of extendable-contractible linear actuators (electric, hydraulic, air, or other suitable system) 31 along the sides of the vehicle. The non-steering Universal-Motor Power Suspension Modules 26 and road tires within the Sponsons 30 are completely above the water surface, thus eliminating the vehicle drive line obstructions below the water line that are common to other amphibious land vehicles. In this water use configuration, the Sponsons 30 and the Monocoque Amphibious-Deck Component 18 assembly form a traditional watercraft cathedral form hull configuration with an aerodynamic-hydrodynamic lifting tunnel 37 between each Sponson 30 and the central hull 18. A multiplicity of lifting chines 38 on the inboard sponson surface of the Sponsons 30 which hydrodynamically streamline the sponsons and provide lift to the vessel at planing speeds, becomes apparent in this view. Also shown is a multiplicity of lifting chines 38 on the exterior hull surfaces of the Monocoque Amphibious-Deck Component 18. The Sponson Hinges 32 which affix the Sponsons 30 to the vehicle is also apparent in this view. Of importance in the invention is the wide flattish winged hydrofoil type wedge keel bottom which provides maximum flotation and lift to assist the craft onto a plane at speed, and to minimize hull draft caused by the internal weight of engines and machinery. Of equal importance in the invention, is the inter-meshing of the multiple step chine 38 hull with the multiple step chines 38 of the sponsons 30 in the Closed Land Use configuration seen in FIG. 31. This inter-meshing of chines allows maximum hull volume, while providing a multiplicity of hydrodynamic lifting surfaces for the vehicle at speed. This amphibious vehicle configuration provides a folding yacht flying bridge deck atop the vehicle, a wide hull beam (nearly double the width of the road configuration) for maximum stability in the water, and a hydrodynamically clean (devoid of underwater road drive machinery, wheels and tires) hull which is made possible by the invention's hinged upward sponsons that raise the road drive train above the waterline. The resultant is capable of high water speeds and rough water operation which is not possible with conventional amphibious land vehicles.

FIG. 35 is the same typical interior floor plan of the Amphibious Motorhome depicted in FIG. 32, but showing the Universal-Motor Power Suspension Modules 26 & 27 within the Sponsons 30 extended outward (as shown in cross section FIG. 34) to form a cathedral hull configuration for water use. In this top view are easily seen the actuators 31 which operate the opening and closing of the Sponsons 30. The top surfaces of the Sponsons 30 (formally the exterior sides of the vehicle in the land travel configuration) form side decks for use on the water. Incorporated within the side decks are folding safety handrails (not shown). Also seen is the fold-down tail gate 39 which serves as a swim step extension when in the horizontal water use position, and serves as a boarding stairway for the vehicle when in an open downward position.

Figure 36:
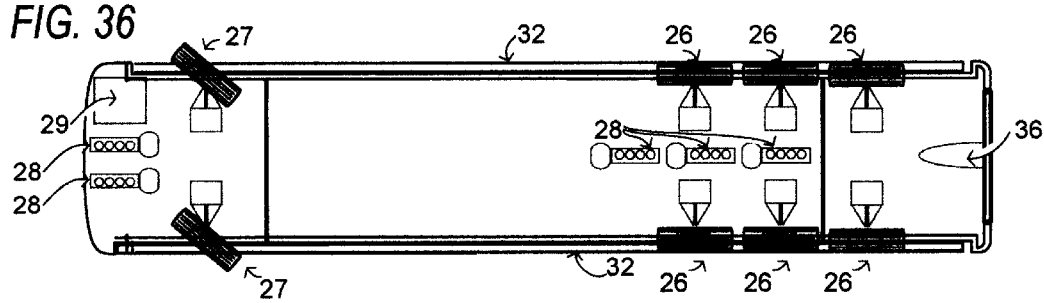
FIG. 36 is a typical schematic top view of the Monocoque Drive-Deck Component of the Amphibious Motorhome depicted in FIG. 32, showing the Bow Power-Bay with two turned-positioned Universal-Motor Power Suspension Modules, two Universal-Electrical Generator Modules and one Systems Control Unit, and showing the lengthened Hull-Bay with four straight-ahead-positioned Universal-Motor Power Suspension Modules and three Universal-Electrical Generator Modules, and showing the Stern Power-Bay with two straight-ahead-positioned Universal-Motor Power Suspension Modules and a waterjet drive unit.

FIG. 36 is a transparent schematic bottom view of the Amphibious Motorhome as depicted in the FIG. 32 view to illustrate the relationship of modules within the hull and within the Sponsons when the Sponsons are closed for land travel. Shown are two steering Universal-Motor Power Suspension Modules 27, five Universal-Electrical Generator Modules 28, one Systems Control Unit 29, six non-steering Universal-Motor Power Suspension Modules 26, and a waterjet drive unit 36. Also shown is the top view of the Sponson Hinges 32 where they are affixed to the body of the vehicle.

Figure 37:
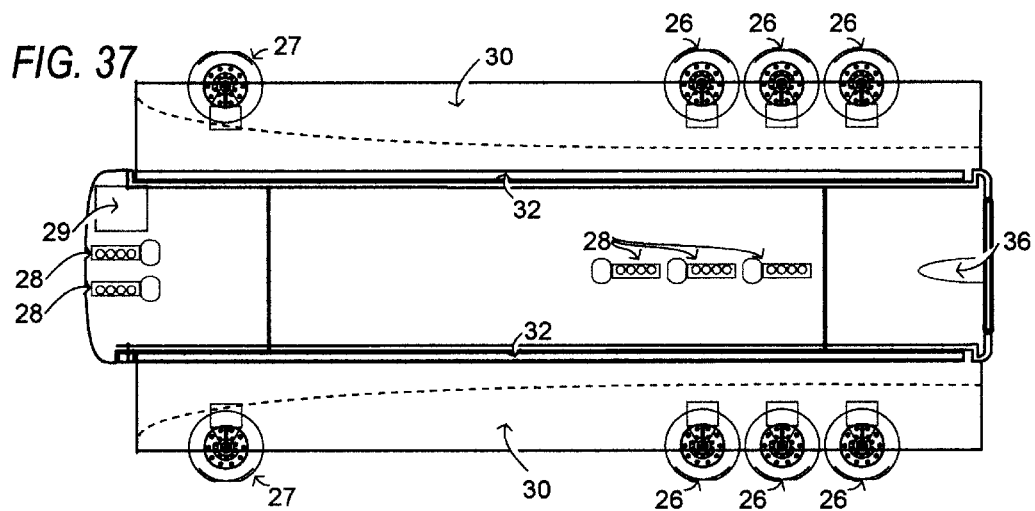
FIG. 37 is the same typical schematic top view of the Monocoque Drive-Deck Component of the Amphibious Motorhome depicted in FIG. 36, but with the Universal-Motor Power Suspension Modules within the Hinged Sponsons extended outward (as shown in cross section FIG. 34) to form a cathedral hull configuration for water use.

FIG. 37 is the same transparent schematic bottom view the Amphibious Motorhome as depicted in FIG. 36 showing the relationship of modules within the hull and within the Sponsons when the Sponsons are extended for travel in water. Shown are two steering Universal-Motor Power Suspension Modules 27, five Universal-Electrical Generator Modules 28, one Systems Control Unit 29, six non-steering Universal-Motor Power Suspension Modules 26, and the waterjet drive unit 36. In this view with the Sponsons 30 are hinged outward, showing the location of the Universal-Motor Power Suspension Modules 26 & 27 moved outboard above the waterline from their land use location depicted in FIG. 36.

Figure 38:
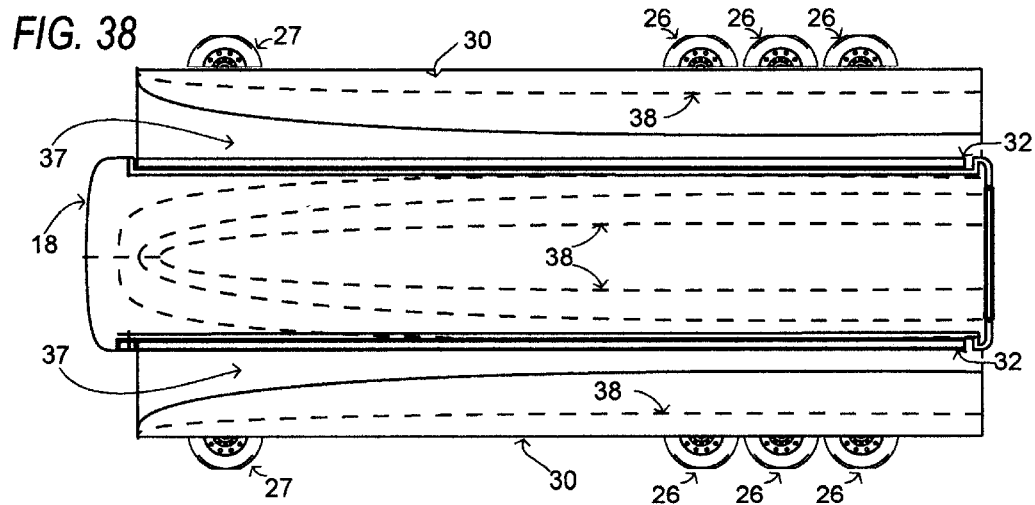
FIG. 38 is a view looking up at the bottom of the typical Monocoque Amphibious-Deck Component (FIG. 37) of said Amphibious Motorhome, with the Hinged Sponsons (containing the Universal-Motor Power Suspension Modules) extended outboard (as shown in cross section FIG. 34) to form a cathedral hull configuration for water use.

FIG. 38 is a non-transparent view looking up at the bottom of said Amphibious Motorhome, with the Sponsons 30 (containing the Universal-Motor Power Suspension Modules) extended outboard (as shown in cross section FIG. 34) to form a cathedral hull configuration for water use. Seen in the view of the bottom of the craft (vehicle) are partial views of tires of the Universal-Motor Power Suspension Modules 26 & 27 extending beyond the Sponsons 30 (which retractable tires have not been contracted within the Sponsons). Also seen is the Sponson hinges 32, the aerodynamic-hydrodynamic lifting tunnels 37 between each Sponson and the central hull 18, and showing (in broken lines) the multiple step chines 38 on the underbody of the craft (vehicle). The number and shape of the multiple step chines 38 vary according to the application to each vehicle type, and the vehicle length, width, and height.

This new invention has been described with respect to the preferred embodiments thereof, and it is to be understood that the invention is not limited to such precise forms of the apparatus, and that some or any combination of the elements may be used, and that changes may be made therein without departing from the scope of the invention defined in the appended claims.

I claim:

1. A recreational vehicle construction arrangement comprising:
   a modular front-end cap and rear-end cap, a deck component, and a roof component;
   an above the roof stiffening system which spans the vehicle front-end cap and the rear-end cap;
   and a full-length vehicle widening slideout unit of a length which reaches substantially from a rear edge of the vehicle front-end cap to a front edge of the vehicle rear-end cap.

2. The recreational vehicle construction arrangement as defined in claim 1 wherein the slideout extends laterally and pivots to further increase the interior spite of the vehicle.

3. The recreational vehicle construction arrangement as defined in claim 1, wherein the roof stiffening system is a truss comprising an assemblage of members Conning a rigid framework spanning the vehicle end caps.

4. The recreational vehicle construction arrangement as defined in claim 1, wherein the roof stiffening system is a monocoque construction in which inner and outer rooftop cowling sections, and sidewall skins carry the stresses of the roof structure.

5. The recreational vehicle construction arrangement as defined in claim 1, comprising a second full-length slideout on another side of the vehicle.

6. The recreational vehicle construction arrangement as defined in claim 1, wherein the full-length slideout is in combination with other length slideouts in the vehicle.

7. The recreational vehicle construction arrangement as defined in claim 1, wherein the vehicle front-end cap and the vehicle rear-end cap are each a self-supporting structure and said roof component is a free spanning roof between said end caps.

8. A recreational vehicle construction arrangement comprising:
   a modular trout-cud cap and rear-end cap, a deck component, and a roof component;
   a cowling enclosing the perimeter of a vehicle rooftop;
   a plurality of rooftop safety handrail, which fold don to a low profile for travel, which fold upward for use, which enclose the perimeter of the rooftop when in the upward position;
   folding rooftop furniture backs of which fold down to a low profile for travel and which backs fold upward for use;
   an above the roof stiffening system which spans the vehicle front-end cap and the rear-end cap;
   and a full-length vehicle widening slideout unit of a length which reaches substantially from a rear edge of the vehicle front-end cap to a front edge of the vehicle rear-end cap.

9. The recreational vehicle construction arrangement as defined in claim 8, wherein the slideout extends laterally and pivots to further increase the interior space the vehicle.

10. The recreational vehicle construction arrangement as defined in claim 8, wherein the roof stiffening system is a truss comprising an assemblage of members forming a rigid framework spanning the vehicle end caps.

11. The recreational vehicle construction arrangement as defined in claim 8, wherein the roof stiffening system is a monocoque construction in which inner and outer rooftop cowling sections, and sidewall skins carry the stresses of the roof structure.

12. The recreational vehicle construction arrangement as defined in claim 8, comprising a second full-length slideout on another side of the vehicle.

13. The recreational vehicle construction arrangement as defined in claim 8, wherein the full-length slideout is in combination with other length slideouts in the vehicle.

14. The recreational vehicle construction arrangement as defined in claim 8, wherein the vehicle front-end cap and the vehicle rear-end cap are each a self-supporting structure and said roof component is a free spanning roof between said end caps.

* * * * *